March 29, 1966    C. F. MEYER ETAL    3,243,652
SOLID STATE RESISTANCE WELDER CONTROL SYSTEM
Filed Aug. 7, 1961    9 Sheets-Sheet 1
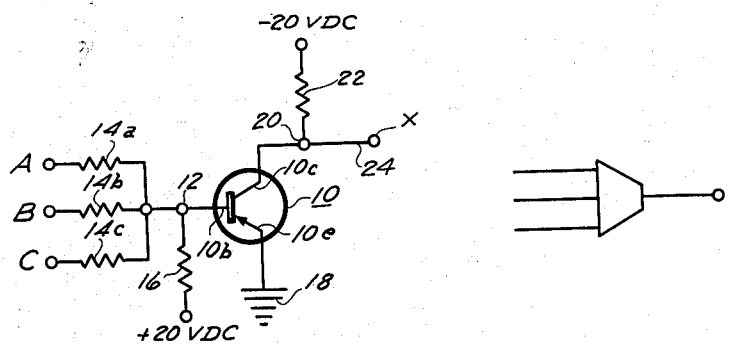
FIG. 1
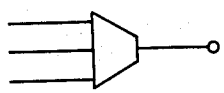
FIG. 2
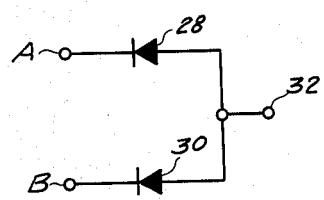
FIG. 3
FIG. 4
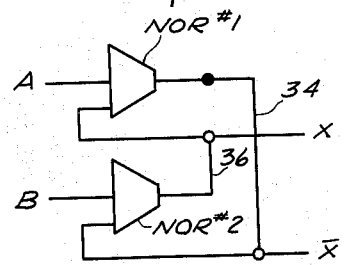
FIG. 5
| A | B | $\bar{X}$ | X |
|---|---|---|---|
| 1 | 0 | 0 | 1 |
| 0 | 1 | 1 | 0 |
FIG. 6
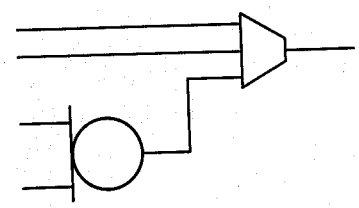
FIG. 7
INVENTOR.
CHARLES F. MEYER
JAMES J. ECKL
BY
William H. Schmeling

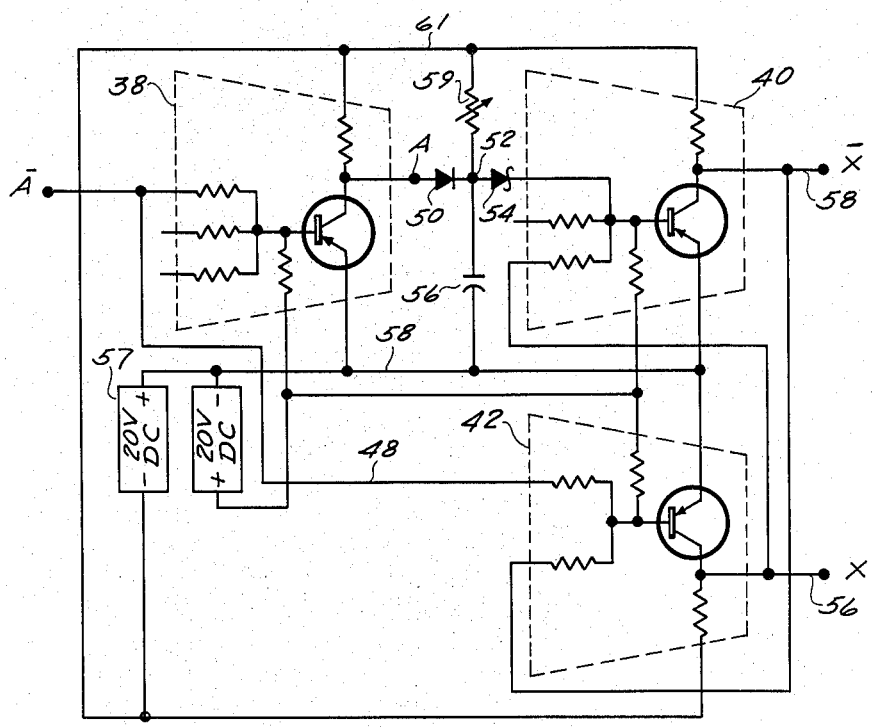
FIG. 8A
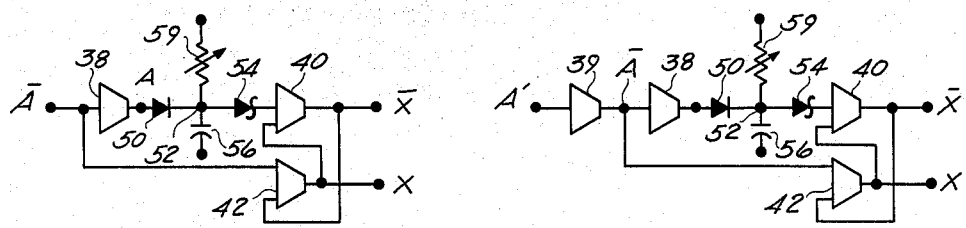
FIG. 8B      FIG. 8D
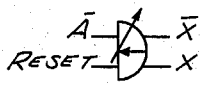      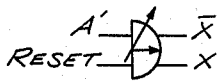
FIG. 8C      FIG. 8E
INVENTOR.
CHARLES F. MEYER
JAMES J. ECKL
BY March 29, 1966   C. F. MEYER ETAL   3,243,652
SOLID STATE RESISTANCE WELDER CONTROL SYSTEM
Filed Aug. 7, 1961   9 Sheets-Sheet 3

INVENTOR.
CHARLES F. MEYER
JAMES J. ECKL
BY

March 29, 1966   C. F. MEYER ET AL   3,243,652
SOLID STATE RESISTANCE WELDER CONTROL SYSTEM
Filed Aug. 7, 1961   9 Sheets-Sheet 4
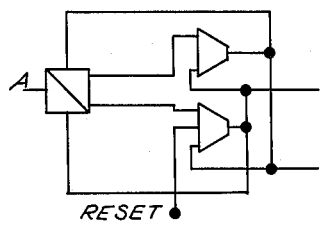
| A | $\bar{X}$ | X |
|---|---|---|
| 0 | 1 | 0 |
| 1 | 1 | 0 |
| 0 | 0 | 1 |
| 1 | 0 | 1 |
| 0 | 1 | 0 |
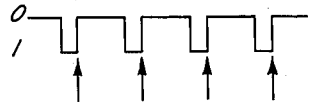
FIG. 14   FIG. 15   FIG. 16
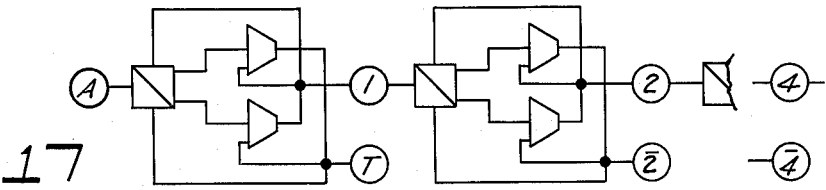
FIG. 17
| COUNT | COUNTER SIGNAL LEVELS ① ② ④ ⑧ | | | | INPUTS TO PRESET NOR |
|---|---|---|---|---|---|
| 0 | 0 | 0 | 0 | 0 | ① |
| 1 | 1 | 0 | 0 | 0 | (T̄) |
| 2 | 0 | 1 | 0 | 0 | (2̄) |
| 3 | 1 | 1 | 0 | 0 | (2̄)(T̄) |
| 4 | 0 | 0 | 1 | 0 | (4̄) |
| 5 | 1 | 0 | 1 | 0 | (4̄)(T̄) |
| 6 | 0 | 1 | 1 | 0 | (4̄)(2̄) |
| 7 | 1 | 1 | 1 | 0 | (4̄)(2̄)(T̄) |
| 8 | 0 | 0 | 0 | 1 | (8̄) |
| 9 | 1 | 0 | 0 | 1 | (8̄)(T̄) |
FIG. 18
| TIMING PERIOD | X | $\bar{X}$ | Y | $\bar{Y}$ |
|---|---|---|---|---|
| SQUEEZE | 0 | 1 | 0 | 1 |
| WELD | 1 | 0 | 0 | 1 |
| HOLD | 0 | 1 | 1 | 0 |
| OFF | 1 | 0 | 1 | 0 |
FIG. 19
INVENTOR.
CHARLES F. MEYER
JAMES J. ECKL
BY
William H. Schmeling March 29, 1966    C. F. MEYER ETAL    3,243,652
SOLID STATE RESISTANCE WELDER CONTROL SYSTEM
Filed Aug. 7, 1961    9 Sheets-Sheet 6

INVENTOR.
CHARLES F. MEYER
JAMES J. ECKL
BY

March 29, 1966  C. F. MEYER ETAL  3,243,652
SOLID STATE RESISTANCE WELDER CONTROL SYSTEM
Filed Aug. 7, 1961  9 Sheets-Sheet 7

INVENTOR.
CHARLES F. MEYER
JAMES J. ECKL
BY

United States Patent Office 3,243,652
Patented Mar. 29, 1966

3,243,652
SOLID STATE RESISTANCE WELDER
CONTROL SYSTEM
Charles F. Meyer and James J. Eckl, Milwaukee, Wis.,
assignors to Square D Company, Park Ridge, Ill., a
corporation of Michigan
Filed Aug. 7, 1961, Ser. No. 129,828
14 Claims. (Cl. 315—194)

The present invention relates to control circuits and is more particularly concerned with static logic circuits for programming a series of operations of predetermined time duration and includes improved static switching circuits as used in logic circuits.

For many years the electrical industry has used electromechanical devices, such as magnetic relays, stepping relays, pneumatic timers and associated circuitry to provide the logical switching of circuits. These devices are readily available, provide numerous contact combinations at a relatively low cost per point switched, and will conduct and break relatively large load currents. Electronic control of resistance welding followed the introduction of the vacuum tube and the thyratron gas tube wherein the thyratron tube provided the switching means and was combined with a timing circuit to control the various timing periods. The disadvantages of thyratron and vacuum tubes are: they require relatively large amounts of power, more panel space than others, and the tube filaments burn open or the tube voltage drop increases.

Most control circuits can be divided into three functions, i.e., input, logic, and output. In the conventional resistance welder controller the input signals are primarily obtained from contact making devices, such as pushbuttons, foot switches and pressure switches, and the solenoid air valve and the control of the magnitude and duration of current to the welder electrodes are the output functions. Thus in a welding system the logic circuitry must accept commands from the input devices and provide adjustable time delay intervals in sequence, and amplified signals for the output functions.

The logic system as will be hereinafter described employs NOR units to achieve the necessary logic functions. The heart of each of the individual NOR logic units is the transistor. Transistors are ideally suited for use in logic systems because of their reasonable cost, small size, lower power consumption, rapid speed of operation, and excellent performance as a switch. A transistor is formed of crystalline material that exhibits properties of an insulator in one state and a conductor in another state. Therefore, it behaves as an open contact in the first state and as a closed contact in the second state.

The operation of a transistor is similar to that of a vacuum tube, i.e., the transister has an emitter corresponding to the cathode of a vacuum tube, a base corresponding to the grid and a collector corresponding to the anode or plate. In a vacuum tube, the grid-cathode voltage bias controls the flow of electrons from cathode to anode and thus controls the switching function. In the PNP transistor, because of the inherent properties of the material at the junction of the emitter and base, a negative base to emitter voltage allows emitter-base current, while a positive voltage bias prevents emitter-base current. Current in the plate circuit of the vacuum tube is controlled by the grid-cathode voltage. In a transistor, current flow in the emitter-collector circuit is a function of the current flow in the emitter-base circuit. Since no moving parts are required to open or close a circuit, static switching results. Reliability and exceptionally long life are thus assured by the use of transistors.

Conventional resistance welder controllers usually are required to sequence and control the duration of a plurality of operations to provide: a Squeeze time period during which the welder electrodes are moved into engagement with the parts to be welded, a Weld period during which welding current is caused to flow for welding the parts together, a Hold period during which the electrodes are held in engagement with the work to permit the welded metal of the metal parts to cool and an Off time period during which the welder electrodes separate so they may be repositioned to form another weld. If desired, the control may also provide a Squeeze delay period which effectively increases the Squeeze period of the first weld sequence when the welder electrodes are initially moved into position to form a series of welds.

The welder control according to the present invention uses static logic components to provide all of the above functions and includes a novel circuit which uses static logic components to provide the well known delay firing, lead-trail and heat control functions normally incorporated in resistance welders.

The static logic controllers hereinafter described may include a novel time delay circuit which will provide a change in an output signal a predetermined adjustable time interval after the receipt or removal of an input signal. The time delay circuit hereinafter described is virtually unaffected by variations in ambient temperature and input voltages and will provide accurate timing over long timing periods.

It is an object therefore of the present invention to provide an improved time delay circuit for use in static logic systems which circuit will operate independently of ambient temperature and input signal voltage variations.

It is a further object of the present invention to provide a time delay circuit for use in static logic systems which will accurately delay the transmission of an input signal change to the time delay circuit for substantially long periods of time in spite of variations in ambient temperature and input signal voltages to the time delay circuit.

In carrying out the above objects, it is another object of the present invention to provide a time delay circuit which can be modified without difficulty to provide a time delay after the time delay circuit receives an energizing input signal or a de-energizing input signal.

It is another object of the present invention to form a resistance welder control completely of static logic components and to include a means in the control for initiating conduction of a pair of ignitrons at a predetermined point on the voltage wave of the alternating current source which supplies welding current through the ignitrons to the primary winding of a welding transformer to minimize magnetizing transients in the welding transformer and to cause the ignitrons to conduct an equal number of half cycles of alternating current during each welding sequence to minimize saturation of the welding transformer and which control may also include a means employing only static logic units for varying the amount of current flow conducted by each ignitron during each of the half cycles the ignitrons are conducting.

A further object of the present invention is to provide a resistance welder control with a means to provide delayed firing, lead-trail, and heat control operation of the ignitrons which means includes only static logic components and operates entirely without mechanical or emissive electronic type devices.

Another object of the present invention is to use NOR type logic units in performing the above mentioned functions.

A still further object of the present invention is to include the aforementioned time delay circuit in the logic system of a resistance welder control to accurately time the operations performed by the welder control.

Another object of the present invention is to provide a resistance welder with a pair of counters which employ only static devices and wherein one of said counters acts as a line frequency counter to determine the time duration of any one of several operations to be performed by the welder control in spite of the fact that each of the several operations may have a different time duration, and to use the other counter to program the sequence of operations.

In carrying out the foregoing objects it is another object to arrange the counters so their input signals occur at different points and during different half cycles of an alternating current voltage wave to provide a static welder controller which incorporates delayed and lead-trail firing of the ignitrons controlled by the welder control.

Further objects and features of the invention will be readily apparent to those skilled in the art from the specification and appended drawings illustrating certain preferred embodiments in which:

FIG. 1 schematically shows the circuit arrangement and components of a NOR unit as used in the logic systems hereinafter shown and described.

FIG. 2 shows a logic symbol used to represent the NOR unit shown in FIG. 1.

FIG. 3 schematically shows the circuit arrangement and components of an OR circuit as used in the logic systems hereinafter shown and described.

FIG. 4 shows a logic symbol used to represent the circuit shown in FIG. 3.

FIG. 5 shows a pair of NOR units as illustrated in FIG. 2 interconnected to provide a NOR memory.

FIG. 6 shows a switching table wherein the various signals present at the inputs and outputs designated in FIG. 5 are designated as "0" and "1."

FIG. 7 illustrates the combination of an OR unit shown in FIG. 4 and a NOR unit shown in FIG. 2.

FIG. 8A schematically shows a time delay circuit according to the present invention as incorporating NOR circuit units as in FIG. 1.

FIG. 8B shows a circuit wherein the NOR logic symbol is used to replace the NOR circuit components in FIG. 8A. This circuit will provide an output signal change after an input signal is removed.

FIG. 8C illustrates the logic symbol which represents the circuit shown in FIG. 8B.

FIG. 8D shows the circuit in FIG. 8A with logic symbols for the logic components. This circuit will provide an output signal change after an input signal is applied.

FIG. 8E illustrates the logic symbol used to represent the circuit shown in FIG. 8D.

Figure 9:
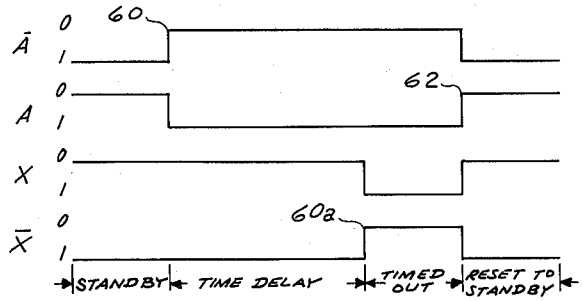

FIG. 9 graphically shows the signals present at the inputs and outputs indicated in FIGS. 8A, B and D during the time intervals indicated.

Figure 10:
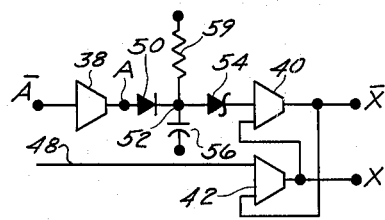

FIG. 10 illustrates another form of the time delay circuit in FIG. 8A wherein a separate input is provided for resetting the NOR memory included in the circuit.

Figure 11:
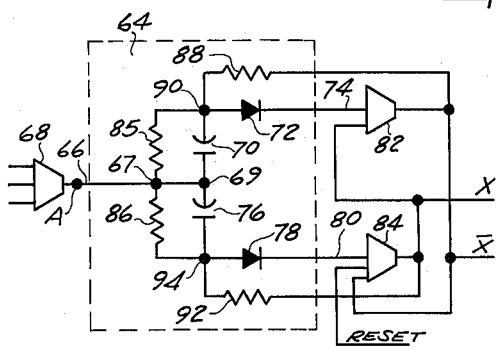

FIG. 11 schematically shows a pulse alternator as used with the counter hereinafter to be described.

Figure 12:
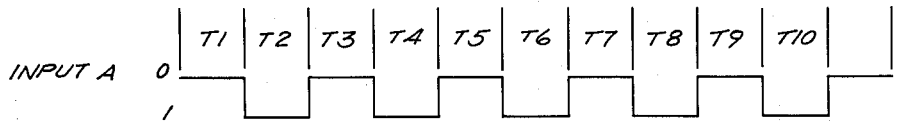

FIG. 12 illustrates in terms of time increments the signals present at the terminals designed in FIG. 11.

Figure 13:
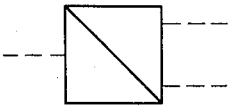

FIG. 13 illustrates the logic symbol used to represent the circuit shown in FIG. 11.

FIG. 14 illustrates the connections required between a pulse alternator shown in FIG. 13 and NOR memory in FIG. 5 to form a binary counter.

FIG. 15 presents a switching table showing the succession of signals present at the terminals indicated in FIG. 14.

FIG. 16 illustrates a stepped curve whereon the points of switching of the NOR memory within the counter are indicated.

FIG. 17 illustrates the interconnections between several counters of FIG. 14 to form a counter which will provide additional states of counting.

FIG. 18 illustrates a table showing the signals present at the terminals indicated in FIG. 17 for the various designated numerical counts.

FIG. 19 in table form illustrates how the signals present on the outputs of a two stage binary counter can be used to control the sequence of operation in a resistance welder controller.

Figure 20:
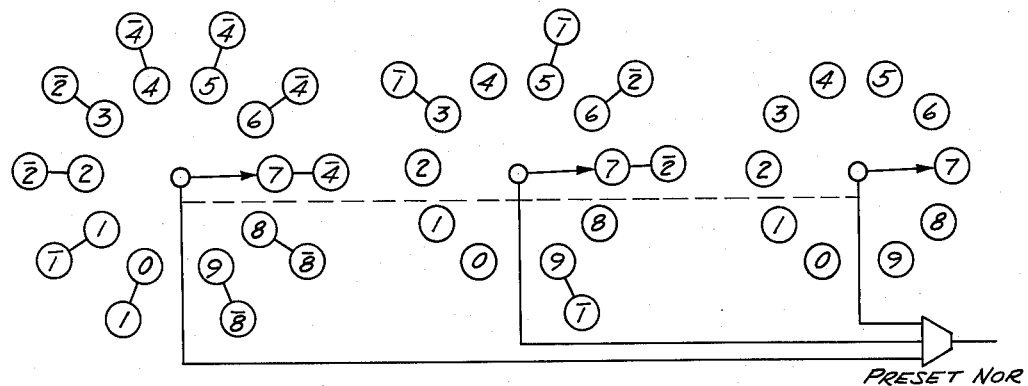

FIG. 20 illustrates diagrammatically the connections between decade switches and counter outputs represented in FIG. 18 and a NOR unit to provide an output when the signal outputs of the counter signify the numerical count selected by the decade switches.

Figure 21:
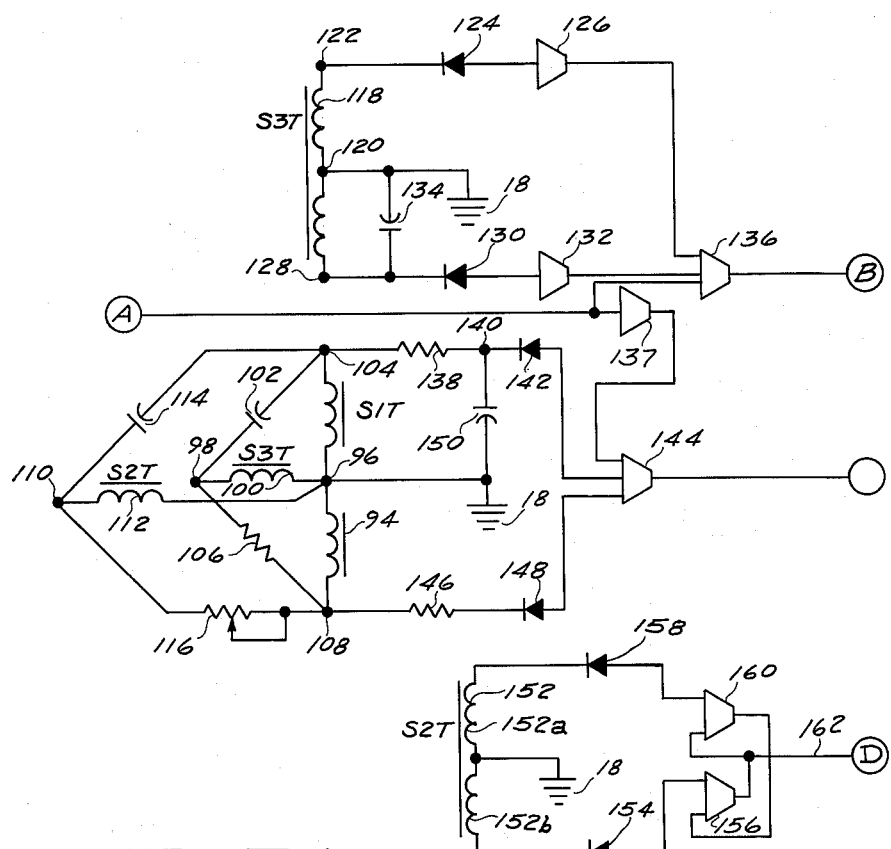

FIG. 21 illustrates schematically the circuits which will provide signals for delayed firing, lead-trail and heat control functions of the welder controller.

Figure 22:
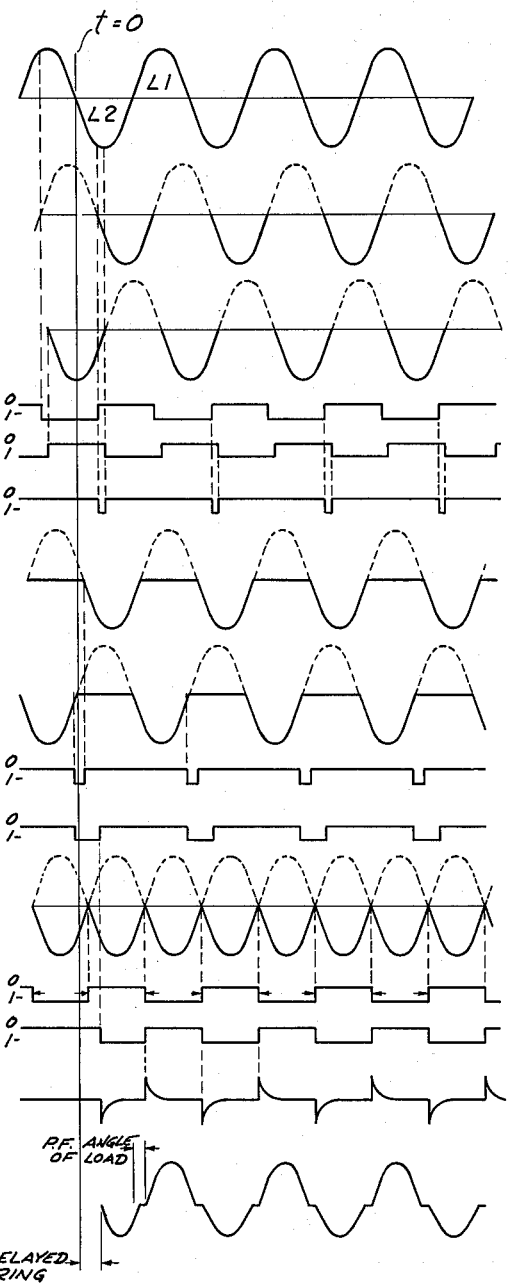

FIG. 22 illustrates the curves and signals with time as a reference provided by the various components shown in FIG. 21.

Figure 23:
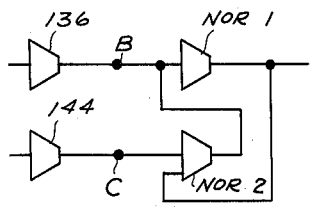

FIG. 23 illustrates the connections of the delayed firing and lead-trail output terminals to a NOR memory.

Figure 25:
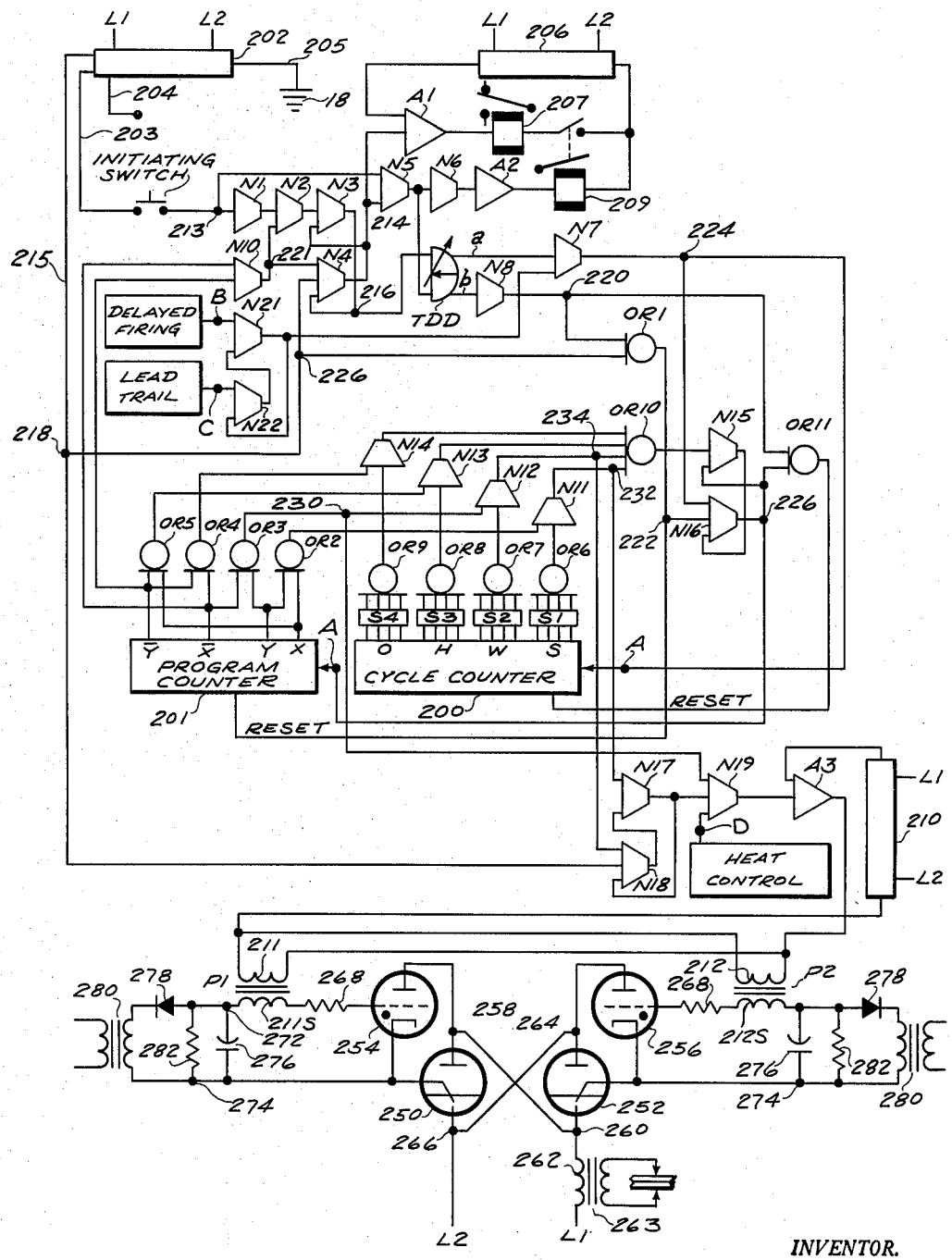

FIG. 25 is a block diagram of a complete four period static welder control system using counter elements as shown in FIG. 17.

Figure 26:
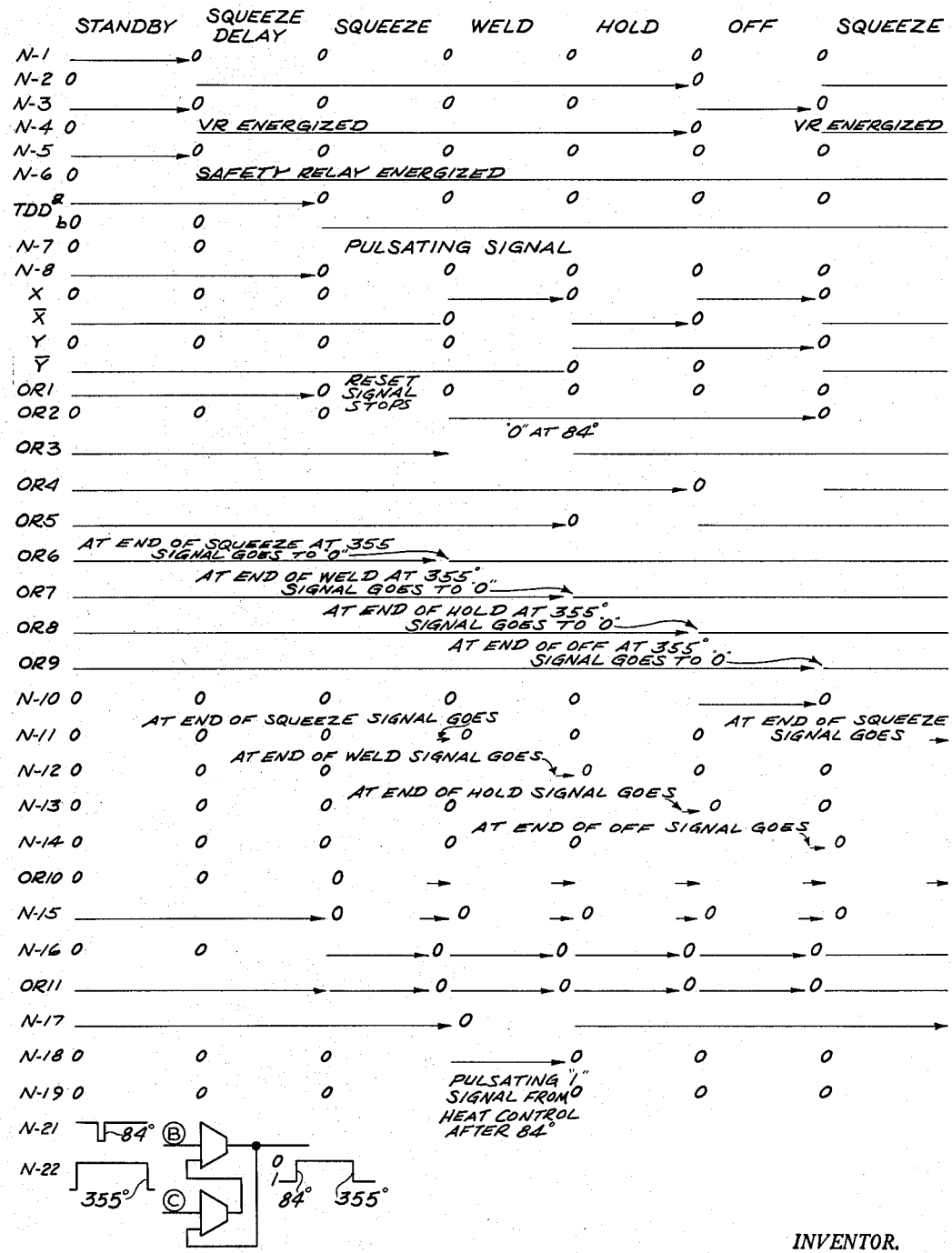

FIG. 26 shows a table indicating the output signal conditions of the various components in FIG. 25 during the operational periods indicated.

Figure 27:
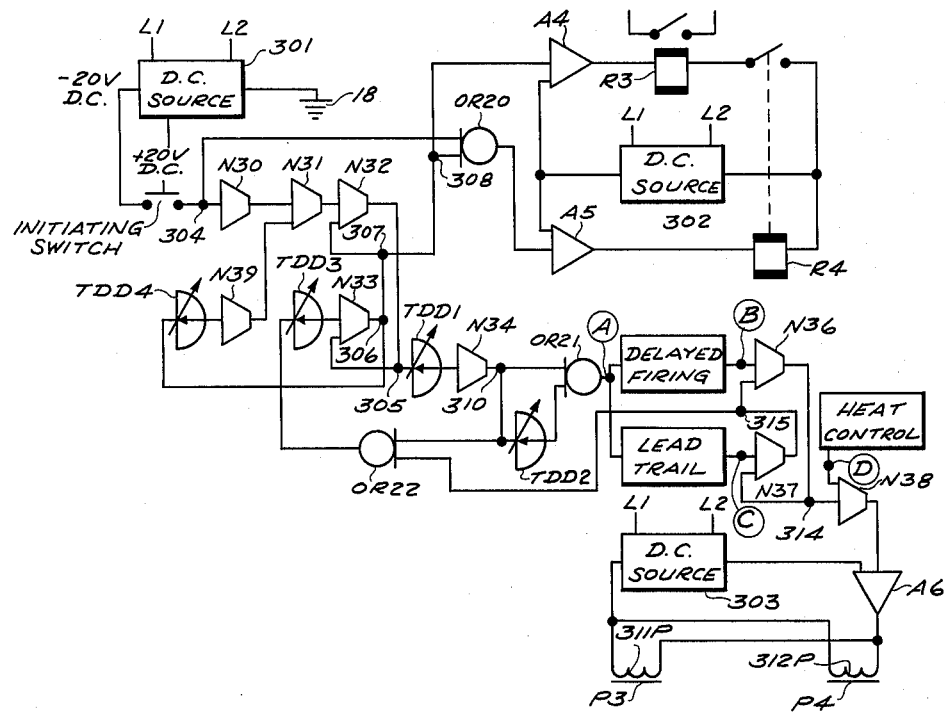

FIG. 27 is a block diagram of a complete four period static welder control system using time delay units as shown in FIG. 8C.

In FIG. 1 of the drawings, a basic circuit for a well known NOR unit is shown. The logic symbol for a NOR unit which includes the NOR circuit is shown in FIG. 2. The NOR circuit employs a PNP type transistor 10 having a base 10b, an emitter 10e and a collector 10c. The base 10b is connected through a junction 12 and resistors 14a, 14b and 14c to input terminals A, B and C respectively. A positive terminal of a 20 volt D.C. source, not shown, is connected through a bias resistor 16 to junction 12 and has its negative terminal connected to ground 18. The emitter 10e is connected to a ground 18. The collector 10c is connected through a junction 20 and a resistor 22 to the negative terminal of a 20 volt D.C. source, not shown, which has its positive terminal connected to ground 18. Also connected to the junction 20 is a lead 24 which constitutes an output lead an is connected to an output terminal X of the NOR circuit.

In the circuit shown in FIG. 1, when a negative voltage pulse of sufficient magnitude is applied to any one of the input terminals A, B and C, to bias the base 10b negative to the emitter 10e, the transistor 10 will become conductive. The negative voltage pulse may originate from a source, not shown, which has its positive terminal connected to ground 18. Normally, when a negative voltage pulse is not impressed on A, B, or C, the base 10b will be biased positive by the positive 20 volts through resistor 16. When this condition exists, the transistor 10 will be nonconductive, that is, there will be no emitter 10e to collector 10c current flow and the potential between junction 20 or lead 24 and ground 18 will be a negative 20 volts. However, when the transistor 10 is rendered conductive by a negative pulse, junction 20 will become less negative and approach the zero potential of the ground.

From the above it is clearly apparent that if an input signal, i.e., a negative voltage, is present at A or B or C, then no signal will be present at the output X and if no signal is present at A or B or C, then a signal will be present at X. Stated in another manner, a signal at A OR B OR C will NOT give a signal at X. Therefore the circuit is termed a NOR circuit, which is a contracted form of the terms "NOT" and "OR."

If the absence of an input at terminals A, B or C is considered as a "0" and the presence of an input at terminals A, B or C, i.e., a negative voltage signal, is considered a "1," and the absence and presence of a signal at the output X is respectively considered a "0" and "1," then it can be seen that an input "0" to A, B and C will result in an output of "1" at X and an input of "1" at the terminals A, B or C will result in an output of "0" at X. In this respect the NOR operates as an inverter.

Combinations of NORS can perform the majority of logic functions required. However, increased design flexibility and lower system cost are both possible by using diodes for OR logic as shown in FIGS. 3 and 4, wherein two or more conventional semiconductor diodes 28 and 30 each have their respective anode terminals connected to a common output terminal 32 and their individual cathode terminals connected respectively to input terminals A and B. Thus when a negative voltage is impressed on terminals A or B, i.e., when a "1" signal is applied to terminals A or B, the diodes 28 or 30 will conduct and transmit the "1" signal to terminal 32. The one-way conduction of the diode provides the input isolation required. Diode OR logic is more economical than NOR unit logic. In applying diode OR logic it must be noted that the OR diode cannot amplify, therefore, all of its output loads must be supplied from the sources of its input signals. If a signal source is therefore overloaded, the use of NOR units (which isolate and amplify) for this OR function is the alternative. FIG. 4 shows symbolically a 2-input OR element. By connecting the outputs of two such units together, a 4-input OR circuit is possible. This technique can be expanded further. FIG. 7 shows symbolically how ORS can be used to increase the possible NOR unit inputs from 3 to 4.

The NOR unit above described in connection with FIGS. 1 and 2 is symbolically shown in FIG. 5 as connected with an additional NOR to provide a memory function. It will be seen that an input of "1" at A to a "NOR #1" will provide an output of "0" at a lead 34 which is impressed to one of the input terminals of "NOR #2." This input of "0" at "NOR #2" will cause "NOR #2" to have an output of "1" which is impressed through a lead 36 to another input terminal of the "NOR #1" to cause "NOR #1" to retain the state caused by the original "1" input after the original "1" input is removed. When the unit is to be reset, an input of "1" at B to "NOR #2" will switch "NOR #2" and cause the output at lead 36 to change from a "1" to a "0" to reset the "NOR #1" to its original state before the input of "1" at A was impressed thereon.

In describing logic functions, a useful technique (borrowed from Boolean algebra symbology) to denote complementary signals is to place a horizontal bar above one of them. Thus X and $\bar{X}$ are complementary, that is, they are always opposite to each other. When X is 1, $\bar{X}$ is 0, and vice versa.

To understand the memory operation as shown by the table in FIG. 6, assume an input at A to "NOR #1" is present momentarily as a "1," consequently "NOR #1" will provide an output at $\bar{X}$ of "0" to provide an input of "0" to "NOR #2," which delivers an output at X of "1." This "1" output at X is fed back as an input into the "NOR #1" to complete the loop. If the input A to "NOR #1" is removed, the combination is stable, as explained. This is one of two states of a "NOR memory" unit. It follows that a momentary input 1 at B to the "NOR #2" reverses the state of the "NOR memory" unit, changing X to 0 and $\bar{X}$ to 1. Several features are noteworthy, namely, the X and $\bar{X}$ are complementary; and the lower NOR provides the X output and the upper NOR the $\bar{X}$ output is shown by the switching table in FIG. 6.

The static time delay circuit shown in FIG. 8A will adjustably delay a change in its output signal after an input signal change. The circuit shown in FIG. 8A is called a TDD time delay circuit. That is, a circuit in which an output signal change will occur an adjustable time interval after an input signal is removed. FIG. 8B shows the circuit in FIG. 8A in a simplified form using NOR logic symbols and FIG. 8C shows a logic symbol for a TDD unit.

The time delay circuit shown in FIG. 8A employs NOR units indicated by numerals 38, 40 and 42. It will be seen that the NOR units 40 and 42 are paired to constitue a "NOR memory," as heretofore described. The time delay circuit has an input terminal $\bar{A}$ connected to one of the input terminals of the NOR 38 which has its output connected to a terminal A. The terminal A is connected through a rectifying diode 50 to a junction 52 that is connected through a zener type diode 54 directly as an input to the base of the transistor in the NOR 40 so as to bypass the base circuit resistors of the transistor in NOR 40 which were described in connection with the circuit shown in FIG. 1. A capacitor 56 is connected between the junction 52 and a common bus 58. The bus 58, represented by ground 18 in FIG. 1, is connected to the emitters in each of the NOR units in the system including the emitters of the transistors in NORS 38, 40, 42. An adjustable potentiometer resistor 59 is connected between junction 52 and a lead 61 which is connected to the negative 20 volt D.C. supply 57 as described in connection with the circuit shown in FIG. 1. For purposes of explanation, the output signals from NORS 40 and 42 will be respectively designated by "$\bar{X}$" and "X." The change in signals A, $\bar{A}$ X and $\bar{X}$ in terms of time is shown in FIG. 9. During standby conditions, $\bar{A}$ signal is "1" which is supplied as an input to NOR 42 causing X to have a "0" signal and $\bar{X}$ to be "1" and causes NOR 38 to conduct and provide a rapid discharge circuit for capacitor 56 through a circuit which includes the common bus 58, the emitter to base circuit of the transistor in NOR 38, the terminal A, the diode 50 and the junction 52. The diode 50 is connected in the circuit to conduct current from terminal A to junction 52 and blocks current flow in the reverse direction. The "1" input signal $\bar{A}$ transmitted through a lead 48 as an input to NOR 42 causes NOR 42 to conduct and provide an X output signal of "0" at an output lead 56 of the time delay. The "0" output X signal of NOR 42 is transmitted as an input to NOR 40 which in turn provides an $\bar{X}$ output signal "1" at the complementary output lead 58 of the time delay unit.

Timing of the time delay circuit is initiated by a change in signal $\bar{A}$ from a "1" to a "0" as shown by the change at 60 in the curve in FIG. 9. As the signal $\bar{A}$ changes from "1" to "0," NOR 42 no longer receives an input signal of "1" from $\bar{A}$ and NOR 38 switches from its conducting to a nonconducting state to cause the signal at A to change from "0" to "1" and interrupt the discharge path for capacitor 56. The voltage across capacitor 56 now increases exponentially as current flows from lead 58 through the capacitor 56, junction 52, and the potentiometer resistor 59 to lead 61. The charge on capacitor 56 causes the junction 52 side of the capacitor to have an increasing negative potential relative to lead 58 which is connected to the emitter of the NOR 40 transistor. When the potential across capacitor 56 exceeds the breakdown voltage of the zener diode 54, current flows in the emitter to base circuit of the transistor of NOR unit 40. This current flow causes NOR unit 40 to be conductive and change its output signal $\bar{X}$ from a "1" to "0" which signifies the end of the timing period as shown by the change in $\bar{X}$ curve designated by numeral 60a in FIG. 9. The "0" output signal $\bar{X}$ is transmitted as an input to NOR 42 to cause NOR 42 to switch and provide an X output signal of "1" which is also fed back as an input to NOR 40.

Resetting of the timing circuit occurs when the signal A changes to "0" as caused by the conduction of NOR 38 in response to a change to a "1" signal at $\bar{A}$. This change in the signals is designated by numeral 62 in FIG. 9. When NOR 38 conducts, it re-establishes the heretofore mentioned rapid discharge path for capacitor 56. The input signal of "1" at $\bar{A}$ is also transmitted as an input to NOR 42 and changes X signal to "0" which is transmitted from NOR 42 as an input to NOR 40 which provides an output signal $\overline{X}$ of "1." The low impedance discharge path of capacitor 56 provided by the NOR 38 transistor will cause a rapid discharge of capacitor 56 and the input signal to the NOR 40 transistor rapidly becomes "0" so the conductive state of NOR 40 changes to provide a "1" output at $\overline{X}$ as indicated in FIG. 9. In connection with the above circuit it is to be noted that the capacitor 56 is directly connected to the base of the transistor within NOR 40 through the zener diode 54 and the resistors 14A, B and C as explained in connection with FIG. 1 have been omitted.

The coupling of the NOR unit 42 with NOR 40 as a memory decreases the response time of the switching of NOR 40 to changes in potential across capacitor 56 which are transmitted through the zener diode 54. This increase in response of NOR 40 to changes in potential across capacitor 56 is particularly evident during long time delay settings of the potentiometer resistor 59. It is clearly apparent that as the zener diode 54 begins to break down in response to the voltage impressed thereacross by capacitor 56, the breakdown will occur slowly at the critical voltage wherein the transistor in NOR 40 is rendered conductive. This relatively slow change in breakdown voltage of the zener diode is amplified by the NOR 40 transistor and is fed as an input signal to NOR 42. This changed signal is further amplified by the NOR 42 transistor and is fed back as an input to NOR 40 to further trigger the switching action. Hence the NOR unit 42 in the NOR memory acts as a feedback unit for the changes of capacitor 56.

FIG. 8D shows a simplified form of the circuit in FIG. 8A using NOR logic symbols wherein an additional NOR unit 39 located in the circuit has an output supplying the input terminal $\overline{A}$. The circuit shown in FIG. 8D, represented by a logic symbol in FIG. 8E, provides a time delay after energization function which is abbreviated as TDE. In a TDE time delay unit, a change in the output signal occurs an adjustable time interval subsequent to the initiation of an input signal. In FIG. 8D, the NOR 39, located between an input terminal A' and the heretofore described input terminal $\overline{A}$, inverts the signal at A' and supplies a complementary signal of A' at $\overline{A}$. Thus during standby conditions terminal A' is supplied with a "0" signal causing a "1" signal at terminal $\overline{A}$ as was described in connection with FIG. 8A. When the signal at A' changes from "0" to "1" at the beginning of the time delay, the signal at $\overline{A}$ immediately becomes "0" and timing begins as heretofore described. After a predetermined adjustable time interval the signals at X and $\overline{X}$ will switch in a manner heretofore described. Upon removal of the signal at A', the time delay circuit will reset as has also been heretofore described.

Obviously, if desired, in each of the embodiments shown in FIGS. 8A, B, and D the connection of lead 48 to the terminal $\overline{A}$ can be omitted so the input to the NOR 42 is no longer directly responsive to the signal at terminal $\overline{A}$. When this arrangement is employed, for example as shown in FIG. 10, it will be seen from the curves in FIG. 9 when the signal at $\overline{A}$ returns from "0" to "1" at point 62, then the timing capacitor 56 will discharge through the conducting NOR 38. However the memory consisting of NORS 40 and 42 was switched by the previously applied input signal of "0" at $\overline{A}$. The input of NOR 42, no longer responsive to the signal at $\overline{A}$ because of the omitted connected to terminal $\overline{A}$, will therefore not reset the NOR memory and the output signals X and $\overline{X}$ will remain unchanged even though the timing capacitor is discharged. The time delay unit will remain in this condition until a separate "1" signal from a separate logic source is applied as an input to the disconnected lead 48 to switch the NOR memory.

Further, if the zener diode 54 is selected so its breakdown voltage is approximately one-half of the voltage difference between the common bus 58 and the lead 61, then the voltage in the collector of the transistor within NOR 38 will be continuously negative relative to the voltage at junction 52. The diode 50 decouples the capacitor 56 from the emitter collector circuit of the transistor in NOR 38 so as to render the charging circuit of capacitor 56 unaffected by the variable collector cutoff leakage current of the transistor within NOR 38 during its nonconducting state as caused by variations in temperature.

A NOR memory can be converted into a binary counter by combining a NOR memory with a pulse alternator as schematically shown in FIG. 11. The pulse alterator within the dotted line rectangle 64, which is shown in its logic symbol form in FIG. 13, includes an input lead 66 which received alternately applied input signals A of "0" and "1" from a suitable logic unit source such as a NOR 68. The input lead 66 is connected through a junction 67 to a junction 69 which in turn is connected through a capacitor 70 and a rectifying diode 72 to an output lead 74 of the pulse alternator. The junction 69 is also connected through a capacitor 76 and a rectifying diode 78 to another output lead 80 of the pulse alternator. The output leads 74 and 80 are respectively connected to the inputs of the NOR units 82 and 84 which are interconnected as a memory and provide respectively the output signals X and $\overline{X}$ as shown. The capacitors 70 and 76 are respectively provided with discharge resistors 85 and 86 which are connected as shown. The $\overline{X}$ output signal is connected through a resistor 88 to a junction 90 located in the lead between the capacitor 70 and the diode 72. Similarly, the X output signal is connected through a resistor 92 to a junction 94 located in the lead between the capacitor 76 and diode 78. Each of the diodes 72 and 78 are connected to conduct current from the capacitors 70 and 76 to the inputs of the respective NORS 82 and 84 with which they are associated and to block current flow in the reverse direction.

The operation of the circuit shown in FIG. 11 will now be described in connection with the curves shown in FIG. 12 wherein the curve A represents the changes in the input signal A, the curve X represents the changes in the output signal X, and the curve $\overline{X}$ represents changes in the output signal $\overline{X}$. The curves 70 and 76 respectively represent the changes in potential across capacitors 70 and 76 wherein the positive base to emitter potential of the capacitors associated with the NORS 82 and 84 is shown as a positive value on the curve. That occurs when junctions 90 and 94 are respectively positive relative to junction 69. A negative value indicates when junctions 90 and 94 are negative relative to junction 69. The changes in the above signals and charges on the capacitors are shown as times T1, T2, T3, etc., which represent the conditions of the signals and charges across the capacitors during the time intervals indicated.

Assuming initially during time T1, A has a "0" signal and the X and $\overline{X}$ signals respectively are "0" and "1," then the potential across capacitor 76 will be 0 because of the equal potential of A and X. The capacitor 70 will be charged negative by the current flow through resistor 88 from $A=$"0" to $\overline{X}=$"1."

When the signal at A changes from "0" to "1" initiating time interval T2, the diode 72 blocks current flow from NOR 82 to junction 69, NOR 82 remains nonconducting. However, during this interval $X=$"0" and $A=$"1," so current flows from X through resistor 92 and capacitor 76 to junction 69 to charge the capacitor 76 to a positive potential. Also during time interval T2, $\overline{X}=$"1" and $A=$"1" and capacitor 70 discharges through resistor 85.

When the signal at A changes from "1" to "0" to initiate time interval T3, the positive potential on capacitor 76 is passed through the diode 78 and overpowers the $\overline{X}$ signal present on NOR 84 to render NOR 84 nonconducting and thereby change its output signal X to "1." This signal is delivered as an input to NOR 82 changing its output $\overline{X}$ to "0." Thus during time interval T3 $\overline{X}$="0" and X="1" and A="0." Thus $\overline{X}$ and A are at equal potential and capacitor 70 does not charge. However, X="1" and A="0," so current flows from A to X through resistor 92 to reverse the charge on capacitor 76 and cause capacitor 76 to have a negative charge impressed thereon.

When the signal at A changes from "0" to "1," initiating time interval T4, X and A are at equal potentials and capacitor 76 discharges through resistor 86. However, $\overline{X}$="0" and A="1" during T4 so current flow from $\overline{X}$ to A through resistor 88 charges capacitor 70 positive.

When A changes from "1" to "0" to initiate time interval T5, the positive charge present on capacitor 70 is transmitted through diode 72 to NOR 82. This transmitted positive charge overcomes the X signal of "1" from NOR 84 and NOR 82 is made nonconductive so its output signal $\overline{X}$ becomes "1." This $\overline{X}$ signal is transmitted as an input to NOR 84 so X signal becomes "0." Thus with A="0," X="0" and $\overline{X}$="1," capacitor 76 does not charge as A and X are at equal potentials. However, $\overline{X}$="1" and A="0," so current passes from A to $\overline{X}$ through resistor 88 to charge capacitor 70 negative returning the memory to the state in which it existed during time interval T1. The switching during time intervals T6–T9 will be repeated in the same sequence as above explained, as is clearly apparent from the curves shown in FIG. 12.

From the foregoing it is apparent that a single input A into the pulse alternator can be used to control the operation of a NOR memory through the two output lines from the pulse alternator which are connected as an input to the NORS of the memory. When the pulse alternator and memory are used as a counter memory as shown in FIG. 14, a reset input signal is required and is connected to an input of the lower NOR of the memory. This reset signal will supply a "1" input to the lower NOR of the memory when power to the system is first applied and at the beginning of each counting operation.

It should be emphasized that the pulses from the transfer circuit are positive voltages with respect to common, therefore, they are used to make NORS nonconducting (output="1"). They are thus distinguished from the usual negative logic signal (the digital "1") which will cause a NOR to conduct to provide an output of "0."

The circuit action can be seen from the switching table in FIG. 15. Beginning with the reset condition, assume a series of "0"–"1"–"0" signals are applied to A and the reset signal has caused the NOR memory to be in the state as shown during time interval T1 in FIG. 12. During the change in the input A from "0" to "1," the memory state is unchanged, however, during the change in A from "1" to "0" (as shown by the arrows in FIG. 16) a positive pulse output is generated to the lower NOR input. The result is to change this NOR from a conducting X="0" to a nonconducting state X="1." The X output will in turn switch the upper NOR to an $\overline{X}$="0" state, as seen from the switching table.

When a second signal at A has also completed the 0–1–0 cycle, upon decay to 0, a pulse to the upper NOR input will cause its output to change to $\overline{X}$="1." Consequently, X=0 and the counter-memory will have been cycled back to its original state. Subsequent signals at A will cause this sequence to repeat.

Two facts are important in understanding the action of a counter memory, namely, a change in the output signals occurs when the input A changes from 1–0, and, after two inputs have cycled thusly, the outputs X and $\overline{X}$ will have returned to their original states. The later feature duplicates the requirements of a binary (or base 2) counter element.

As indicated in FIG. 17, additional states of counting can be obtained by connecting output X from one counter memory to an input of a succeeding counter memory. Therefore, when X output of the first counter memory changes from 1–0 after an input count of 2, the outputs of the second counter memory will switch. The information counted by the first stage will thus be retained by passing it ahead into the following stages of the counter.

Identical counter-memories have been interconnected in FIG. 17 to show the manner in which information at A is stored in nonambiguous form using the binary counting technique. The output wires of each stage, formerly X and $\overline{X}$, have been relabeled (and circled) with the decimal equivalent count which they represent. To determine the decimal count stored in the binary counter, first determine which stages have their upper outputs at a signal level of 1 (lower output at 0), then add their decimal equivalent counts. For example, when outputs ①, ② and ④ are at the 1 signal level, the counter has counted seven consecutive signals at A. Note that the outputs of any stage switch only when the previous stage outputs have changed from 1–0, as in FIG. 18. Also that each stage has two output wires, ④ and ④̄, etc., which are always complementary signals. When ④=1, ④̄=0, and vice versa. The reset line has been omitted for diagram simplicity. In normal practice it would be connected to one input of the lower NOR in each stage.

When the counter as shown in FIG. 17 is used to control the duration of an operation such as the duration of one of the operational sequences in a resistance welder, the input A to the first counter stage is provided with a cyclic signal that is synchronized with the power line frequency. The outputs of the various stages of the memory counter are connected through suitable decimal calibrated selector switches to the inputs of a NOR unit as shown in FIG. 20. The NOR unit shown in FIG. 20 is termed the "Preset NOR" and the connections to the selector switches are made so a logic signal output of "1" is obtained as an output from the "Preset NOR" when the counter has counted the passage of the desired number of impulses to the counter to signal the end of the timing interval. The table on FIG. 18 illustrates how the foregoing may be accomplished wherein the vertical column furthest to the left indicates the count at which the output of the Preset NOR in FIG. 20 switches from "0" to "1." The next four vertical columns to the right of the first column indicate the binary stages whose output signals have stored the respective decimal count. The last vertical column lists the counter outputs which must be connected through the selector switches to the Preset NOR inputs so that when the counter has reached the selected count all of the inputs to the Preset NOR will be "0" and the preset NOR will switch to provide an output of "1" thereby ending the counting period.

To determine these connections it is apparent the Preset NOR output will be "1" when counter stages ①, ②, ④ and ⑧ have reached the decimal numbers which their sum total represents. By applying combinations of the signals ①, ②, ④ and ⑧ to the inputs of the Preset NOR, the preset NOR's output will be "1," when the counter has reached the desired count.

For example, a preset count of 7 requires use of binary stages 4, 2 and 1. When signals ④, ② and ① are equal to 1, signals ④̄, ②̄ and ①̄ equal 0. By connecting these usual negative logic signal (the digital "1") which will "1" at the count of 7. This technique of presetting is possible only when the counter is first reset, counts up to the preset number, is reset, etc.

FIG. 19 illustrates how a program counter formed of a pair of counter-memories can be employed to sequence the operation of a resistance welder. The operation of the program counter in a resistance welder controller to achieve the results will be hereinafter explained.

The circuit in FIG. 21 provides the delayed firing, lead trail and heat control functions of the resistance welder. These terms are all well known to those familiar with resistance welders and therefore will not be further defined.

In FIG. 21 a transformer S1T has its primary winding, not shown, energized from a suitable source of alternating current. The transformer S1T has a secondary winding 94 center-tapped at 96. Connected between the center tap 96 and a junction 98 is a primary winding 100 of a transformer S3T. A condenser 102 is connected between one end terminal 104 of the transformer secondary 94 and junction 98 and a resistor 106 is connected between junction 98 and a terminal 108 at the other end of the secondary winding 94. Also connected between junction 96 and a junction 110 is a primary winding 112 of a transformer S2T. A capacitor 114 is connected between junctions 110 and 104 and an adjustable resistor 116 is connected between junctions 110 and 108.

The transformer S3T has a secondary winding 118 center-tapped at 120. One end terminal 122 of winding 118 is connected through diode 124 to an input of a NOR unit 126. The other end terminal 128 of winding 118 is similarly connected through diode 130 to an input of a NOR 132. A capacitor 134 is connected between junctions 120 and 128. The outputs of NORS 126 and 132 are respectively connected to two inputs of a NOR unit 136 which has its output connected to a terminal B. The NOR 136 also is supplied with an input from a terminal A, the purpose of which will be later apparent from the description of FIG. 27.

The terminal 104 of the secondary winding 94 is connected through a resistor 138, a junction 140, and a diode 142 to an input terminal of a NOR unit 144. Similarly, the terminal 108 of winding 94 is connected through a resistor 146 and a diode 148 to another input terminal of NOR 144. A capacitor 150 is connected between center tap 96 and junction 140. The NOR 144 is also supplied with an input from terminal A through a NOR 137 for the purpose which will be described in connection with FIG. 27.

The transformer S2T has a secondary winding 152 having one end terminal connected through diode 154 to an input of a NOR unit 156. The other end terminal of winding 152 is connected through diode 158 to an input terminal of a NOR unit 160. The NOR units 156 and 160 are interconnected as a NOR memory with the output lead 162 of the NOR unit 156 connected to provide an output signal at a terminal D.

With the circuit components as shown in FIG. 21 thus described, the operation thereof will now be explained in connection with the curves shown in FIG. 22 wherein curve 22A illustrates the sinusoidal voltage wave of the alternating current supply which is connected to energize the primary winding of transformer S1T. Curves 22B and 22C illustrate the alternating current voltage wave of transformer S3T respectively between terminal 122 and center tap 120 and between terminal 128 and center tap 120. Capacitor 134 provides a slight phase-back of the output voltage of S3T winding across terminal 128 and center tap 120. The primary winding 100 of transformer S3T is connected across a conventional RC phase shift network including resistor 106 and capacitor 102 which are selected to phase the voltage of primary winding 100 at approximately 84° lagging the L2 polarity of the voltage wave of curve 22A.

The opposite polarity signals shown on curves 22B and 22C are respectively applied as input signals to NOR unit 126 and 132. The diodes 124 and 130 in series with the inputs to NOR units 126 and 132 respectively prevent the positive polarity of the alternating current signal from exceeding the reverse base to emitter voltage rating of the transistors in the NOR units. The curves 22D and 22E respectively represent the output signals of NOR units 126 and 132 respectively in response to the input signals shown on curves 22B and 22C. It will be seen that the sinusoidal voltage waves of curves 22B and 22C are squared by NOR units 126 and 132 and are impressed as inputs to the same NOR unit 136. The NOR unit 136 will have an output of "1" only when the voltage signals on curves 22D and 22E are equal to "0." This will occur as shown on curve 22F in a narrow interval between 84° and 87° after the voltage as shown in curve 22A passes through zero at time $t=0$. The signal shown on curve 22F is used to initiate the flow of welding current as will be later explained to minimize magnetizing transients in the transformer which supplies the welder electrodes. The importance of this feature is more fully described in U.S. Patent 2,873,421 to Robert C. Mierendorf, which was filed April 25, 1955, and assigned to the assignee of the present application.

The curves 22G, 22H and 22J illustrate an arrangement for accomplishing lead-trail firing of the ignitrons in the circuit to the welder transformer primary, as will now be explained. The term "Lead-Trail" is also conventional, and will be understood by those familiar with resistance welders. The terminals 104 and 108 of the secondary winding of transformer S1T are respectively connected through diodes 142 and 148 to two inputs of the same NOR unit 144. The diodes 142 and 148 prevent reverse current flow through the transistor of NOR unit 144 and the resistors 138 and 146 prevent excessive current flow through the transistor of NOR unit 144. The capacitor 150 is selected so the voltage wave at junction 140 as shown on curve 22G lags the voltage wave at terminal 104 as shown on curve 22A. Thus as a voltage as shown at junction 140 and a voltage at terminal 108 which is shown on curve 22H are applied as inputs to the same NOR unit 144, the output of NOR unit 144 will be "0" except when the voltages of both waves on curves 22G and 22H are "0," or positive. This will occur as shown on curve 22J in a narrow interval between 355° and 15° relative to time $t=0$, as is shown in curve 22A.

The output of NOR unit 136 which provides a signal as shown on curve 22F is connected to an input of an upper NOR unit "NOR #1" of a NOR memory including "NOR #1" and "NOR #2," as shown in FIG. 23. If the output of NOR unit 144, which provides a signal as shown on curve 22J, is connected to the input of the lower NOR unit "NOR #2" of the NOR memory, as shown in FIG. 23, the NOR memory will provide an output signal as shown on curve 22K. That is after $t=0$, "NOR #1" will have an output signal of "1." At 84°, NOR unit 136 will provide a "1" signal as shown on curve 22F, thereby switching "NOR #1" of the NOR memory so the output thereof becomes "0." At 355°, the "NOR #2" of the memory receives a "1" signal from NOR unit 144 as shown on curve 22J. Thus the memory will switch and provide a "1" output signal until at 84° the NOR unit 136 again switches to a "1" output to again switch the memory.

Curve 22M on FIG. 22 shows the output voltage wave of the secondary windings 152a and 152b of transformer S2T. This voltage wave lags the voltage wave as shown in curve 22A because the primary winding 112 of transformer S2T is located in a conventional RC phase shift bridge including the fixed capacitor 114 and the adjustable resistor 116. As in conventional practice, the resistor 116 when adjusted will cause a corresponding change in lag of the voltage wave shown in curve 22M.

One output terminal of winding 152 is connected through diode 158 to an input terminal of the upper NOR 160 of a NOR memory. The other output terminal is connected through diode 154 to the lower NOR unit 156 of a NOR memory. The secondary windings 152a and 152b of transformer S2T provides two alternating current voltages as inputs to diodes 154 and 158 which are 180° out of phase with each other. These voltages are applied to both inputs of a NOR memory including NOR units 156 and 160. The diodes 154 and 158 block positive polarity current flow through the bases of the transistors in NOR units 156 and 160, as previously explained. The input voltage supplied by windings 152a and 152b, as shown on curve 22M, causes NOR units 156 and 160 of the NOR memory to switch twice in each cycle. The NOR memory will thus provide an output at terminal D as shown on curve 22N wherein the output at D changes from "0" to "1" to "0" respectively, at the frequency of curve 22A. The arrows in curve 22N indicate this signal can be phase shifted by adjusting resistor 116 for heat control of the weld current. If the voltage pulses as shown on curves 22K and 22N are impressed as inputs to other NOR units, as will be hereinafter explained, the NOR units will provide an output as shown on curve 22P. A circuit arrangement for utilizing the signal shown on curve 22P is shown in FIG. 27, which will be also hereinafter described. In FIG. 27, the numeral N38 designates a single NOR unit which is connected through an amplifier to provide a signal to a pair of primary windings of a transformer having secondary windings connected to control the grid to cathode potential of a pair of thyratrons in the firing panel of a resistance welder controller, as will be hereinafter explained, then the rate of change of the direct current change through the transformer windings during switching $di/dt$ of the amplifier multiplied by the inductance L of the transformer, will produce a series of isolated voltage pulses as shown in curve 22R. When these pulses are impressed on the control elements such as the control gate of a silicon controlled rectifier or the control grid of the thyratrons in the firing panel of the welder, welding current will flow according to curve 22S, wherein it will be seen that during the first half cycle of current flow in the welding transformer primary, current flow will be initiated at 84° after $t=0$ and the ignitrons will fire for adjusted half cycles in a lead-trail sequence for the remaining half cycles during the weld time interval.

A diagram employing logic symbols to show a complete four-period static welder control using counter elements is shown in FIG. 25. In the controller shown in FIG. 25, a logic circuit accepts commands from the initiating switch and in response thereto supplies signals to suitable amplifiers which in turn energize the output devices which include a safety relay, an air valve, and a transformer which provides proper signals to an ignitron-type contactor for controlling the passage of current through the primary winding of a welding transformer.

In FIG. 25, the various NOR units shown are provided with designations of N1 through N22. Similarly, the OR units are designated OR 1 through OR 10. A time delay unit similar to that illustrated in FIG. 10 is designated as TDD because it transmits an output signal change a predetermined time interval after receiving an input signal change. The control also includes a cycle counter designated by the numeral 200 and a program counter designated by the numeral 201. These counters are fully explained in connection with FIGS. 11–20 and the operation thereof will become hereinafter apparent. The control includes delayed firing, lead-trail and heat controls which respectively supply signals at B, C and D, as shown in the drawing. The operation and signal provided by the delayed firing, lead-trail, and heat control are explained in connection with FIGS. 21, 22 and 23.

The control preferably is provided with a direct current source 202 which is energized by an alternating current source, not shown, through lines L1 and L2. The source 202 is arranged to provide a negative 20 volt output at lead 203 and a positive 20 volt output at lead 204 relative to a lead 205 which is connected to ground 18. The connection of these leads to the various NOR circuits in the system is clearly apparent from the description which accompanied FIG. 1 of the drawings. In the interest of simplifying the drawings and improving the understanding thereof, the connections of the ground lead 205 and positive 20 volt lead 204 to the various logic units in the system are not shown.

The control has suitable conventional amplifiers A1, A2 and A3, each of which receives an input signal as will be later explained, and is arranged to provide an amplified output in response to the input signal. The amplifiers A1 and A2 are each shown as energized from a suitable D.C. source 206 which is connected to an alternating current supply through leads L1 and L2. The amplifier A1, upon receipt of a proper input signal, causes a valve relay 207 to be energized. The valve relay 207, as in conventional resistance welder control practice, causes the electrodes of the resistance welder to engage a workpiece to be welded. The amplifier, A2, when energized, causes a safety relay 209 to be energized which closes a pair of contacts in the valve relay 207 circuit. The amplifier A3 is energized from a suitable source of D.C. current 210, which is supplied from an alternating current source through lines L1 and L2. When amplifier A3 is energized, current is supplied to the primary windings 211 and 212 of a pair of pulsing transformers P1 and P2.

An initiating switch, which is so designated, has one of its contacts connected to lead 203 and its other contact connected to a junction 213 which in turn is connected to the input of NOR N1 and to one of two inputs of NOR N5. The output of NOR N1 is connected to one of two inputs of NOR N2. The output of NOR N2 is connected to the input of a NOR N3 of a NOR memory which includes NOR N4. The NOR N4 has three inputs, one of which receives the output of NOR N3 and the others which will be later described. The output of NOR N5 is connected through a junction 214 to the input of NOR N6 and to the reset input of the time delay unit TDD. The output of NOR N3 is also connected through a junction 216 to the initiating input of the time delay unit TDD. The output lead of NOR N6 is connected to the amplifier A2. The source 202 is arranged to provide a momentary "1" signal when the source is initially energized. This "1" signal is transmitted through a lead 215 to a junction 218 and provides an off return signal to the various logic components of the system. The junction 218 is connected through a junction 226 to another input of NOR N4 and to one of the two inputs of OR 1. An output lead "a" of the time delay unit TDD is connected to one of two inputs of NOR N7. The complementary output "b" of the time delay unit TDD is connected to an input of NOR N8 which has an output connected to a junction 220. The junction 220 is connected to the other input of OR 1 and to one of the two inputs of OR 11.

The cycle counter 200, as previously described, may include any number of counting memories to achieve any number of cycle counts depending upon the time interval of the various functions which are to be timed by the welder controller. The outputs of the cycle counter are connected through a suitable number of selector switches designated as S1, S2, S3 and S4, to the inputs of ORS 6, 7, 8 and 9. The switches S1–4 are of the type illustrated in FIG. 20, which are suitably ganged for selecting the number of counts to determine the time intervals of the Squeeze, Weld, Hold and Off periods which are designated respectively by "S," "W," "H" and "O" in the cycle counter 200. The ORS 6, 7, 8 and 9 have outputs respectively connected to one of two inputs of NORS N11, 12, 13 and 14, as shown. The NORS N11–14 serve as preset NORS, the operation of which is fully described in connection with FIG. 20. The outputs of NORS N11–14 are respectively connected through an OR 10 to an input of NOR N15 of a NOR memory which includes NOR N16.

The program counter 201, which comprises a pair of binary counters, has outputs X, $\overline{X}$, Y and $\overline{Y}$ with the outputs respectively connected to ORS 2–5, as shown. That is, OR 2 is connected to outputs X and Y, OR 3 is connected to outputs Y and $\overline{X}$, OR 4 is connected to outputs $\overline{X}$ and $\overline{Y}$ and OR 5 is connected to outputs X and $\overline{Y}$. The outputs of ORS 2 and 3 are respectively connected to the other inputs of NORS 11 and 12 and the outputs of ORS 4 and 5 are respectively connected to the other inputs of NORS 14 and 13. The outputs $\overline{X}$ and $\overline{Y}$ of the program counter are also connected to the inputs of NOR N10, which has an output connected through a junction 221 to the other inputs of NOR N2 and NOR N4. The output of OR 1 is connected through a junction 222 to another input of NOR N16 and the reset input of the program counter 201. The output of NOR N7 is connected through a junction 224 to the other input of NOR N16 and to the input A of the cycle counter 200. The output of NOR N16 is connected through a junction 226 to the other input of OR 11 and to the count input of A at the program counter 201. The output of OR 11 is connected to the reset input of the cycle counter 200. The NOR N17 which is part of a NOR memory including NOR N18, has an input connected to the output of NOR N11 at junction 232. Similarly, the reset input to NOR N18 of the memory is connected to the output of NOR N12 at junction 234. The NOR N18 also has an off return input connected to junction 218. The output of the memory unit including NORS N17 and N18, taken as the output of NOR N17, is connected to one of three inputs of NOR N19. Another input to NOR N19 is connected to an output of OR 3 at junction 230. The third input of NOR N19 is connected at terminal D to the heat control panel which is fully described in connection with FIG. 21. The output of NOR N19 is connected to the input of the amplifier A3. The NORS N21 and N22 which are connected as a NOR memory provide delayed and lead-trail firing as described in connection with FIG. 23. The output of NOR N21 is connected to the other input of NOR N7 for the purpose which will be later explained.

The operation of the logic circuit shown in FIG. 25 will now be described. During standby conditions leads L1 and L2 are energized and the initiating switch is open. During this interval the NOR unit N1 is disconnected from the negative source and its output is "1." The output signals of the various logic units shown on FIG. 25 is graphically illustrated in FIG. 26 wherein an arrow signifies a "1" output and an O a "0" output. During the time interval when the initiating switch is open, NOR units N1, 3, 5, 8, 15, and 17 will have an output signal of "1" and NOR units N2, 4, 6, 7, 10–14, 16, 18 and 19 will have an output signal of "0." The NORS N21 and N22 will receive input signals and in response thereto provide an output signal as shown. The output "a" of the time delay unit TDD will be "1" and the output of "b," "0." OR 11 will transmit a "1" signal from NOR N8 to reset the cycle counter 200 and OR 1 will transmit the "1" output from NOR N8 to the program counter 201 as a reset signal.

As seen in FIG. 19, during the standby and squeeze time intervals, the program counter 201 will cause X and Y to have a "0" signal and $\overline{X}$ and $\overline{Y}$ to have a "1" signal. This in turn will cause OR 2 to have a "0" signal and ORS 3, 4 and 5 to have a "1" output signal. Also during standby, because of the setting of switches S1–4, the cycle counter 200 will provide an input of "1" through ORS 6, 7, 8 and 9 to cause NOR units N11–14 to have a "0" output signal. NOR 8 provides an input signal of "1" to OR 1 which resets the program counter 201 and the memory including NORS 15 and 16, $\overline{X}$ and $\overline{Y}$ provide an input of "1" to NOR 10, causing it to have an output signal of "0." NORS 21 and 22 which are connected as memories, have a signal as previously described impressed at terminals B and C inputs. Therefore the memory, including NORS 21 and 22, will provide an output signal that goes from "1" to "0" at 84° and returns from "0" to "1" at 355°. The heat control signal impressed on NOR unit 19 also goes from "0" to "1" and "1" to "0," as illustrated in curve 22N of FIG. 22.

The squeeze delay period begins when the initiating switch is initially closed to connect the inputs of NORS N1 and N5 to the negative 20 volt source and cause the inputs to NORS N1 and N5 to become "1." NOR N1's and NOR N5's output thereby becomes "0" to switch NORS N2 and N6 output to "1" because NOR N10 which is connected to provide an input to NOR N2 continues to have a "0" output. The "1" output of NOR N2 is applied as an input to NOR N3 of a NOR memory which includes NOR N4 causing NOR N3 to have a "0" output and NOR N4 to have a "1" output. The "1" input signal to NOR N5 causes NOR N5 to have a "0" output signal which through junction 214 causes NOR N6 to have a "1" output signal which causes the amplifier A2 to supply necessary current to cause relay 209 to be energized and closes its contacts in the circuit to the valve relay 207. The output signal of "1" of NOR N4 is caused by the switching of the NOR memory which continues to maintain NOR N5 in a conducting condition should the initiating switch be opened. The output of NOR N4 also supplies an input signal to amplifier A1, thereby causing energization of the valve relay. The valve relay has contacts which close a circuit, not shown, which causes movement of the welder electrodes to the work engaging position. The output signal "0" of NOR N5 also removes the reset input to the time delay unit TDD. The change in the output signal of NOR N3 from "1" to "0" initiates the timing of TDD. The transmission of this signal, input change to the time delay unit TDD to NORS N7 and N8 is delayed, as was explained in connection with the circuit shown in FIGS. 8 and 9, so that the leads "a" and "b" respectively continue to have an output signal of "1" and "0" during the squeeze delay time interval. Thus NOR N8 will continue to have a "1" output signal which is transmitted through OR 1 to continue the reset signal to NOR N16 and the program counter 201. Also, the output signal of NOR N8 is transmitted to OR 11, continuing the reset signal to the cycle counter 200. The NOR N19 also continues to receive a "1" output signal from OR 3, preventing the heat control from switching NOR N19.

The Squeeze period begins at the end of the Squeeze delay period as determined by the adjustment of the time delay unit TDD. At the end of Squeeze delay, the previously indicated "0" signal from NOR N3 causes output "a" of unit TDD to become "0" and output "b" to change to "1." The "0" signal at output "a" causes NOR N7 switching to be controlled exclusively by the memory which is composed of NOR units N21 and N22. As shown in FIG. 26, NORS N21 and N22 provide an output signal which switches from "1" to "0" at 84° and from "0" to "1" at 355°. Thus the output signal of NOR N7 will be "0" during the interval between 355° and 84° and "1" during the interval between 84° and 355°. This pulsating signal which continues during all Squeeze, Weld, Hold and Off periods is transmitted through junction 224 to reset the lower NOR unit N16 of the memory N15 and N16 and is transmitted as an input at A of the cycle counter 200. As was previously explained, the counter circuit is arranged so it switches each time the signal thereto goes from "1" to "0." Therefore at 355° of each cycle, the cycle counter 200 switches. OR 2, because of the state of the program counter 201, during the squeeze period has a "0" output which is supplied as an input to NOR N11. Thus the switching of NOR N11 is exclusively controlled by the output of OR 6. When the cycle counter 200 reaches the count determined by the setting of switch S1, the output of OR 6 becomes "0." Thus as ORS 2 and 6 both have "0" output signals, preset NOR N11 output signal becomes "1" at 355° at the end of the Squeeze period. This "1" output signal from preset NOR N11 is transmitted through OR 10 as an input to NOR 15 which causes NOR N15 to have a "0" output at 355° of the supply voltage wave. The switching of NOR 15 causes the NOR N16 of the memory to switch and provide a "1" signal at junction 226 during the interval of 355° to 84°. This signal is transmitted through OR 11 to reset the cycle counter 200. In this connection it is to be noted that the memory reset signal which is supplied from NORS N21 and N22 through NOR 7 to the memory consisting of NORS 15 and 16 exists and is sustained by the memory consisting of NORS 15 and 16 from 355° to 84°. This will assure proper reset of the counter and eliminate any effects of the previously charged capacitors in the pulse alternator shown in FIG. 11 which were impressed thereon during the counting period as the reset signal exists over a time interval greater than the discharge time interval of the capacitors. At 84° the output of NOR N7 becomes "1." This signal is supplied as an input through junction 224 to NOR N16, causing NOR 16 of the memory to switch and cause the signal at junction 226 to change from "1" to "0" at 84°. This "1" to "0" signal is transmitted as an input signal at A to program counter 201 and causes the program counter to switch from Squeeze to Weld as shown in FIG. 19, wherein X and $\overline{Y}$="1" and $\overline{X}$ and $Y$="0." When the X and Y signals thus change at the beginning of the Weld period, the output signal of ORS 2, 4 and 5 become "1" and the output signal of OR 3 goes from "1" to "0" at 84° because the program counter 201 was caused to shift at 84°. OR 3 supplies an input signal through junction 230 to NOR N19. Thus the switching of NOR N19 after 84° is dependent upon the input signals provided by the heat control at D and signal provided by the NOR memory which includes NORS N17 and N18. During the Squeeze delay and Squeeze periods, preset NOR N11 supplies a "0" signal to NOR N17. At the end of the Squeeze interval at 355°, the preset NOR N11 output changes from "0" to "1" to provide a momentary pulse. The pulse from preset NOR N11 is transmitted through junction 232 as an input to NOR N17 and causes the NOR N17 of the memory to switch and provide a "0" signal as an input to NOR N19. Thus the inputs to NOR N19 from junction 230 and NOR N17 are both "0" so that after 84° during the first half cycle of the weld period NOR N19 will have a pulsing output signal complementary to the pulsing signal applied at D from the heat control as shown on curve 22P in FIG. 22. The pulsing output signals from NOR N19 will be supplied as an input to the amplifier A3 which has its output connected through the primary windings 211 and 212 of transformers P1 and P2. Thus when the output of NOR N19 passes from a "0" to "1," the inductance within the transformers P1 and P2 will cause the secondary windings 211S and 212S of transformers P1 and P2 to produce a sharp output voltage pulse of one polarity and when the output signal of NOR N19 changes from "1" to "0" the transformer secondaries 211S and 212S will pulse and provide a signal of the opposite polarity. These signals which are shown on curve 22P of FIG. 22 will cause the thyratrons in the ignitron tube firing panel to be conductive, as will be hereinafter explained.

When the cycle counter 201 reaches the setting of the Weld period selector switch S2, the output of OR 7 changes to "0" at 355°, as previously described. This output is connected to preset NOR N12 as an input. Also during the Weld period, the OR 3 has a "0" output which is also applied as an input to preset NOR N12. At 355° the preset NOR N12 provides an output signal which goes from "0" to "1." This signal is transmitted through OR 10 to the memory consisting of NORS N15 and N16 and through the OR 11 to reset the cycle counter.

The "1" signal pulse from preset NOR N12 which occurs momentarily at 355° is transmitted to NOR N18 to switch the memory including NOR N17. The output of NOR N17 thus is switched to "1" at 355° and is applied as an input to NOR N19. This signal change in the output of NOR N16 occurs during the voltage cycles when the heat control at D is furnishing a "1" signal so as not to produce a firing pulse and thereby permitting only full cycle flow of welding current which is lead-trail firing. When the signal from N7 becomes "1" at 84°, the memory consisting of NOS N15 and N16 switches to provide a "0" signal at junction 226, causing shift of the program counter 201. As seen on FIG. 19, X and $\overline{Y}$ become "0" and $\overline{X}$ and $Y$ become "1." Thus ORS 2, 3 and 4 output signals become "1" and OR 5's output becomes "0," beginning the Hold period. OR 3, through junction 230, supplies a "1" signal to NOR N19, thereby additionally preventing the output signal of NOR N19 to switch in response to the signals at D.

During the Hold period, NOR N10 receives a "1" input signal from $\overline{X}$ so output signal of NOR N10 does not cause switching of NORS N2 or N4.

At the end of the Hold period, when the cycle counter 200 reaches the count selected by switch S3, the OR 8 at 355° signal changes from "1" to "0." Also, because OR 5 has a "0" output signal, preset NOR N13 switches to provide a "1" output pulse to the memory which includes NORS N15 and N16, causing the cycle counter to be reset and the program counter to switch from HOLD to OFF at 84°, as shown in FIG. 19, wherein X and Y are both "1" and $\overline{X}$ and $\overline{Y}$ are "0." The simultaneous "0" signals of $\overline{X}$ and $\overline{Y}$ which occur only during the OFF period are transmitted as inputs to NOR N10 causing NOR N10 to switch and have a "1" output. The "1" output of NOR N10 is transmitted as an input to NORS N2 and N4, causing NOR N2 to have a "0" output which is transmitted to the memory consisting of NORS N3 and 4. Thus the memory switches with NOR N3 providing a "1" output and NOR N4 providing a "0" output. The "1" output of N3 is transmitted to the time delay unit TDD. However, TDD does not reset in response to the signal from NOR N3, as the signal merely discharges the timing capacitor without resetting the memory of the time delay unit, as is clear from the description of FIG. 8. Therefore outputs "a" and "b" of the time delay unit TDD remain unchanged.

If the initiating switch is held closed during the "off periods," NOR N5 will continue to receive an input signal of "1" and will provide an output signal of "0" at junction 214. The "0" signal at junction 214 causes NOR N6 to continue its output signal of "1" and thereby continue the energization of the safety relay 209. Also, the "0" signal from NOR N5 to the time delay unit TDD will cause its outputs "a" and "b" to remain unchanged. However, the "0" output signal from NOR N4 is transmitted as an input to amplifier A1 to cause the de-energization of the valve relay 207 so that the valve relay opens its circuit making contacts to cause separation of the electrodes of the resistance welder.

In all other respects the control remains in the condition in which it existed during the Hold period; that is, the cycle counter 200 continues to count in response to its pulsating input signals at A from NOR N7 and when the cycle counter 200 has reached the count as determined by the setting of switch S4, OR 9 output will become "0" and as the output of OR 4 is also "0," preset NOR N14 will switch to have a pulse output of "1" to cause the memory consisting of NORS N15 and N16 to switch and provide an input signal at A to the program counter which steps from "OFF" to "SQUEEZE" at 84°. The logic units will return to the states and provide the output functions as previously described for the Squeeze period. If the initiating switch is open at any time during the OFF period, then the inputs to NORS N1 and N5 will be removed and the control will return to the Standby condition. During the Squeeze, Weld and Hold periods, th output "0" of NOR N10 does not switch the memory, including units N3 and N4, so an effective holding circuit is provided for the initiating switch and therefore only during the Off period can the sequence be interrupted.

A typical ignitron-type tube firing panel is shown in the lower portion of FIG. 25. The panel includes a pair of ignitron tubes 250 and 252 each provided with an anode, cathode and igniter electrode and a pair of electronic switches, such as thyratrons 254 and 256, each of which respectively have an anode and a cathode and a control grid. The anode of thyratron 254 is connected through a junction 258 and a junction 260 and a primary winding 262 of a welding transformer 263 to a supply lead L1. The cathode of ignitron 252 is connected to junction 260. The anode of thyratron 256 is connected through a junction 264 to a junction 266 which is connected to the cathode of ignitron 250 and to a supply lead L2. The leads L1 and L2 are connected to a suitable source of alternating current which has the same frequency and is in phase with the source which supplies the logic systems and amplifiers which have been previously described. The thyratron tubes 254 and 256 each are provided with a grid bias circuit and a pulsing circuit which will render the thyratrons conductive which will now be described.

The control grid of thyratron 254 is connected through a suitable current limiting resistor 268 and the secondary winding 211S of transformer P1 to a junction 272. The cathode of thyratron 254 is connected through a junction 274 and a capacitor 276 to junction 272. The capacitor 276 is charged with a bias to maintain thyratron nonconducting by a circuit which includes a rectifying diode 278 and a secondary winding 280 of a transformer which has its primary winding connected to an alternating current supply, not shown. Connected across the diode 278 and secondary winding 280 is a resistor 282 which is in parallel with capacitor 276 across the supply. The diode 278 is arranged in the circuit so normally the cathode of thyratron tube 254 is positive relative to the lead. The transformer secondary winding 211S is inductively coupled with the primary winding 211 which receives pulsating current from amplifier A3. The secondary winding 211S thus will have sharp positive voltage spikes induced therein during the interval when the anode of thyratron 254 is positive relative to the cathode. These voltage spikes are sufficient to overcome the bias provided by capacitor 276. Thus the grid of thyratron 254 is made positive relative to the cathode and the tube 254 conducts during the periods when lead L1 has a positive polarity. When the thyratron tube 254 conducts, current flows from the anode thereof through the igniter of the ignitron 250 and the ignitron 250 becomes conductive. Thyratron tube 256 likewise has a similar grid biasing circuit and is provided with a secondary winding 212S which has sharp voltage pulses induced therein in response to the change in current in the primary winding 212 as caused by the pulsations of amplifier output A3. When the secondary winding 212S produces a sharp output voltage pulse of the proper polarity, thyratron tube 256 will be rendered conductive to thereby cause ignitron 252 to conduct. It is clearly apparent that if the secondary windings 211S and 212S are properly connected in the grid circuits of tubes 254 and 256 respectively, then if tube 254 is caused to be rendered conductive on the signal change of "0" to "1," as shown in curve 22R of FIG. 22, then on the succeeding half cycle the thyratron tube 256 will receive a pulse which will cause it to be rendered conductive when the voltage pulse on curve 22R changes from "1" to "0." Therefore the lead-trail firing of the ignitrons 250 and 252 is assured. The pulsing of windings 211S and 212S as shown on curve 22R will be in phase with the pulses produced by NOR N19 in response to the pulse output of the heat control at D, as shown on curve 22P. The firing of the ignitrons is shown on curve 22S. Thus as the phase of the pulses on curve 22P is shifted, the current flowing through the ignitrons is varied to achieve heat control as well known to those skilled in the art.

A static resistance weld control shown in FIG. 27 employs a plurality of time delay circuit units shown and described in connection with FIG. 8. The control illustrated in FIG. 27 for purposes of explanation, is provided with three separate sources of direct current 301, 302 and 303 which are arranged to be energized by a suitable source of alternating current via leads L1 and L2. The source 301 has a negative 20 volt output lead, a positive 20 volt output and a ground lead 18. The source 301 provides the power for the logic circuit elements which have been heretofore described. The source 302 is connected through a pair of amplifiers A4 and A5 to energize relays R3 and R4 respectively. The relay R4 has a pair of contacts which are closed when the relay is energized. These contacts as shown are included in the circuit with the relay R3 which has contacts included in a circuit, not shown, for energizing a means for moving the electrodes of the resistance welder. The source 303 is connected through an amplifier A6 to energize primary windings 311P and 312P of a pair of transformers P3 and P4 respectively, which are arranged to control the firing of the thyratrons in the ignitron control panel as was described in connection with the embodiment shown in FIG. 25.

The negative 20 volt terminal of the source 301, connected through a normally open initiating switch to a junction 304, provides a negative 20 volt potential at the junction 304 when the initiating swich is closed. The junction 304 is connected to one of two input leads of an OR 20 and to an input of a NOR N30. The output lead of NOR N30 is connected to one of two inputs of a NOR N31 which has its output connected to an input of a NOR N32 which is part of a NOR memory, including a NOR N33. The output lead of NOR N32 is connected through a junction 305 to one of two inputs of the NOR N33 and to an input of a time delay unit TDD1. The output of the NOR N33 is connected through a junction 306 and a junction 307 to the other input of NOR N32 and to the other input of OR 20 and to the input of an amplifier A4 at a junction 308. The output of OR 20 is connected to an input to amplifier A5. A lead to the output of the time delay unit TDD1 is connected to an input of a NOR N34 which has its output connected through a junction 310 to one of two inputs of an OR 21. The junction 310 is also connected to an input of a time delay unit TDD2 and to one of two inputs of an OR 22. The output of time delay unit TDD2 is connected to the other input of OR 21. The output of OR 21 is connected through a terminal A to a delayed firing circuit and a lead-trail circuit, which are shown and described in connection with FIG. 21. The output at terminal B of the delayed firing circuit is connected to one of two inputs of a NOR N36, which is part of a NOR memory unit which includes a NOR N37. The output of NOR N36 is connected through a junction 314 to one of two inputs of NOR N37 and to one of two inputs of a NOR N38. The output at C of the lead-trail circuit is connected to the other input of NOR N37 which has its output connected through a junction 315 to the other input of NOR N36 and to the other input of an OR 22. A heat control circuit, which is also described in connection with FIG. 21, has an output terminal D connected to the other input of NOR N38 which has its output connected as an input to amplifier A6. The output of OR 22 is connected to an input of a time delay unit TDD3 which has its output connected to the other input of NOR N33. The output of NOR N33 is also connected through the junction 306 to an input of a time delay unit TDD4. The output of time delay unit TDD4 is connected to an input of a NOR N39 which has its output connected to the other input of NOR N31.

With the above circuit in mind, the operation thereof will now be described. During standby conditions, that is, before the initiating switch is closed, NORS N30, 32, 34 and 36 will have a "1" output signal and NORS N31, 33, 37, 38 and 39 will have a "0" output signal. The OR 20 will have a "0" output and ORS 21 and 22 will have a "1" signal and the amplifiers A4, 5, and 6 will not provide an output to energize the components in circuit therewith. The time delay units TDD1, 2 and 3 will have a "0" output and time delay unit TDD4 will have a "1" output signal.

When the initiating switch is closed to begin a welding sequence and more particularly to begin the squeeze period, NOR N30 and OR 20 will have an input connected to the negative 20 volt supply. The output signal of NOR N30 thus changes from "1" to "0" and the output of OR 20 changes from "0" to "1." The output signal of "1" from OR 20 to amplifier A5 causes the amplifier A5 to have an output and energize relay R4, causing closure of the relay R4 contacts in the circuit of the energizing coil of relay R3. The "0" output of NOR N30 causes NOR N31 to switch and momentarily have a "1" output because at this time NOR N39 has a "0" output. The "1" output of NOR N31 is received as an input by the NOR memory consisting of NORS N32 and N33 and causes the memory to switch from its standby condition so that NOR N32 has a "0" output and NOR N33 has a "1" output. The "1" output of NOR N33 is transmitted through junction 306 as an input to the time delay unit TDD4, thereby resetting the time delay unit TDD4 so that output thereof becomes "0" as an input to NOR N39. NOR N39 thus switches to have a "1" output which is transmitted to the other input of NOR N31 thereby changing its output from a momentary "1" to "0." However, the "0" output of NOR N31 does not change the state of memory consisting of NOR units N32 and N33 and the memory continues to furnish a "1" signal at junctions 306 and 307 and a "0" signal at junction 305. The "1" signal at junction 307 is transmitted as an input through junction 308 to the other input of OR 20 and to the input of the amplifier A4. The amplifier A4 in response to the signal at junction 309 causes the relay R3 to be energized to close its contacts in the circuit which controls the welding electrodes providing the contacts of relay R4 are closed. Relay R4 is energized in response to an input to amplifier A5 which receives its signal from OR 20 upon closure of the initiating switch. The signal to OR 20 at junction 308 provides a holding circuit should the initiating switch be opened after the NOR memory consisting of NORS N32 and N33 has switched.

After a predetermined time interval, as determined by the adjustment of the resistor in the time delay unit TDD1, the Squeeze period ends and the Weld period begins when the "0" input signal previously applied as an input to time delay unit TDD1 from NOR N32 causes the output from time delay unit TDD1 to change to "1." This "1" signal is transmitted as an input to NOR N34 causing its output to become "0." The output signal of "0" from NOR N34 is transmitted through junction 310 to the ORS 21 and 22 and to the time delay unit TDD2. During the Weld period the time delay unit TDD2 has a "0" output. Thus the output of OR 21 changes from "1" to "0" which is impressed at terminal A.

From the circuits shown in FIG. 21, it will be observed that a "1" signal at A will be simultaneously impressed as inputs to NORS N137 and N136. The "1" signal to NOR N136 will cause its output to be "0" at terminal B. Simultaneously, the "1" signal input to NOR N137 will cause its output to be continuously "0" which is impressed as an input to NOR N144. When the NOR N137 provides a "0" input to NOR N144 the switching of NOR N144 is exclusively controlled by the output signals from diodes 142 and 148. These signals are respectively shown on curves 22G and 22H in FIG. 22. The combined signal from diodes 142 and 148 normally is "1." However, during a period from 355° to 15° the combined signal becomes "0." NOR N144 will provide an output signal which is normally "0" which changes at 355° to 15° to a "1" signal. This signal from NOR N144 is transmitted to terminal C. Thus during standby conditions NOR N37 has a "0" output which is transmitted through junction 315 to NOR N36. Also prior to the change of the input signal at A to the delayed firing circuit, the output of NOR N136 at B is "0." Therefore NOR N36 has a "1" output which is transmitted as an input to NOR N38, causing NOR N38 to continuously have a "0" output. When the signal at A goes to "0," the delay firing circuit causes the signal at B to change from a "0" to "1" at 84° so that the NOR memory, including NORS N36 and N37 switches so a "0" signal is present at junction 314 and is transmitted as an input to NOR N38. Also when the input at A goes to "0," NOR N137 constantly provides a "1" output signal which causes NOR 144 output and the lead trail signal at C to be constantly "0." Thus the memory remains switched once it is triggered at 84° by the signal at terminal B. Therefore the switching of NOR N38 is exclusively under the control of the heat control circuit which provides a signal at D which signal has the characteristic shown on curve 22N of FIG. 22. Thus after 84° of the first half cycle of the voltage wave of the supply, the thyratrons and ignitrons in the firing panel will fire and continue to fire as long as both inputs or OR 21 receive "0" input signals. It will be seen from the curve 22N in FIG. 22 that the signal from the heat control panel at D switches from "0" to "1" when the voltage wave of the alternating current supply as shown in curve 22A has polarity of L1. The curve 22P, which represets a typical output signal from NOR N38 at one heat control setting, shows that the output signal of NOR N38 changes from "0" to "1" as a complement of the signal at terminal D and the output of NOR N38 becomes "1" on an L2 polarity of the alternating current supply voltage wave of curve 22A and "0" on the L1 polarity. The secondary windings of transformers P3 and P4, if properly arranged in the grid circuits of the thyratrons in the ignitron firing panel as shown in FIG. 25 will cause one of the thyratrons to begin its conduction when the signal output of NOR N38 goes from "0" to "1" and cause the other thyratron to conduct when the signal from NOR N38 goes from "1" to "0." Further, it is well known that once a thyratron or an ignitron becomes conductive it no longer has its conduction controlled by the grid or ignitor electrodes, and the thyratron and ignitron will continue to conduct as long as the anodes are positive relative to the cathodes thereof. Thus if the traverse of the output signal of NOR N38 from "1" to "0" through transformer P3 causes thyratron 254 to conduct on the L1 polarity and the traverse of the output signal from NOR N38 from "0" to "1" through transformer P4 causes thyratron 256 to be rendered conductive, lead-trail firing of the ignitrons 250 and 254 is assured. The foregoing occurs because the lead-trail circuit supplies a "1" signal at C during the interval from 355° to 15° or when the heat control circuit at terminal D is furnishing a "1" signal. The "1" signal at C switches NORS N36 and N37 after the signal at A becomes "1." The NOR N38 has a "1" signal output only when both of its input signals are "0." Thus the signal of "1" at junction 314 will not have any effect until the signal at D goes to zero and the subsequent return of a "1" signal at D will not change the conductive state of NOR N38.

It is further apparent from the foregoing that conduction of the thyratrons cannot occur earlier than 84° on the first half cycle regardless of the setting of the heat control unit. However, if the heat control resistor 116 is set for a minimum heat setting, i.e., the ignitrons are to begin conducting later than 84°, then the setting of the heat control circuit will determine the initial conducting point of the ignitrons. If the resistor 116 is adjusted so the pulses on curve 22N are shifted to the right and the output signal at terminal D from the heat control circuit changes from "1" to "0" after 84°, then NOR N38 will not change to have an output of "1" until after 84°. Thus during the initial half cycle, the conduction of the lead firing ignitron will be controlled by the heat control circuit and not by the delayed firing circuit.

As heretofore stated, at the beginning of the weld period the output signal from NOR 34 switches to "0," and the output of NOR N37 switches form "0" to "1" in response to a "0" signal at A. This "1" signal is transmitted through junction 315 as an input to OR 22. Thus the "1" output signal from OR 22 to the time delay unit TDD3 continues during weld time.

After a time interval as determined by the setting of the adjustable resistor in the time delay unit TDD2, the weld period ends and the Hold period begins when the output signal of time delay unit becomes "1" which is transmitted to OR 21 as an input. This "1" signal which is transmitted also to terminal A for the purposes heretofore described also causes the signal from junction 315 to OR 22 to become "0." OR 22 thus provides a "0" input to the time delay unit TDD3.

After a time interval as determined by the adjustment of the resistor in the time delay unit TDD3, the Hold period ends and the Off period begins. The Hold period ends when the input of "0" to time delay unit TDD3 from OR 22 causes the output signal after time delay to change from "0" to "1," which signal is transmitted as an input to NOR N33. The "1" input signal to NOR N33 switches the memory which includes NOR N32 and N33 so the signal at junction 305 becomes "1" and the signal at junctions 306, 307 and 308 becomes "0." The "1" signal at junction 305 is transmitted as an input to the time delay unit TDD1 to reset the time delay unit TDD1 so it's outputs immediately change from "1" to "0." This "0" signal is inverted by NOR N34 and appears as a "1" signal at junction 310 and through OR 21 provides a "1" signal at terminal A. The signal at junction 310 also causes the time delay unit TDD2 to immediately reset and provide a "0" output signal. Further, the "1" signal at junction, 310 is transmitted through OR 22 to immediately reset time delay unit TDD3. The "0" signal present at junctions 306, 307 and 308 is respectively transmitted as inputs to the OR 20, the time delay unit TDD4 and amplifier A4. If the intitating switch is closed at the end of the Off period the output of OR 20 remains "1" as the OR 20 continues to receive a "1" signal at its other input even though the signal at junction 308 is "0." Thus the input to amplifier A5 remains "1." The amplifier A5 thus continues the energization of relay R4.

The "0" signal at junction 308 during the Off period is transmitted as an input to amplifier A4 which in response to the "0" signal causes the relay R3 to be de-energized to cause separation of the welder electrodes to permit reposition of the welder electrodes on the workpiece to be welded.

The "0" signal present during the Off period at junction 306 appears as an input to the time delay unit TDD4, which times the duration of the Off period. After a time interval as determined by the setting of the adjustable resistor in the time delay unit TDD4, the "0" signal input switches the output signal from "0" to a "1" and the Off period ends and a new Squeeze period begins if the initiating switch is closed. The "1" signal output of time delay unit TDD4 is inverted by NOR N39 and appears as a "0" input to NOR N31 which also receives a "0" input from NOR N30. Thus the output signal from NOR N31 switches to "1" and switches the memory so the signal at junction 305 is "0" and the signal at junctions 306, 307 and 308 is "1." The "1" signal at junction 306 resets the time delay unit TDD4 to its output signal of "1" again becomes "0." The "1" signal at junction 308 has no effect because OR 20 is receiving a "1" signal through the closed initiating switch. The switching of the signal at junction 305 from "1" to "0" causes the time delay unit TDD1 to begin timing of the squeeze period and the "1" signal at junction 308 causes the output of amplifier A4 to change so relay R3 is energized to actuate the welder electrodes.

After time delay unit TDD1 times out to provide a "1" output signal, the sequence heretofore described is repeated.

If the initiating switch is open during Squeeze, Weld or Hold periods, then after the time delay unit TDD3 provides a "1" output signal to switch the memory including NORS N32 and N33 so that junction 305 has a "1" signal and junctions 306, 307, and 308 have a "0" signal, the amplifier A4 will cause relay R3 to be de-energized and time delay unit TDD4 will time out as heretofore described. However, the "1" input through the initiating switch to OR 20 is removed so OR 20 now provides a "0" output signal to amplifier A5. The "0" signal causes the output of amplifier A5 to cease so relay R4 is de-energized. Thus all of the logic components are in the condition indicated as standby, which was previously described.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A control for sequencing and controlling the duration of a plurality of separate operations, comprising; means including NOR logic units for controlling the sequence of said operations, an individual time delay unit each including a NOR memory for timing each of said operations having an input responsive to a signal from the NOR logic units and providing an output signal at the end of the operation timed thereby, and means including a pair of NOR units connected as a switchable bistable NOR memory with one of said time delay units being connected to an input of said NOR memory for switching the NOR memory to one bistable state and another of said time delay units being connected to another input of the NOR memory for switching the NOR memory to its other bistable state.

2. A control for a resistance welder having a pair of ignitrons connected to an alternating current supply and conductive for conducting full wave alternating current from the suuply to a load, comprising; a first counter having NOR unit components for timing the duration of an operation, said counter being arranged to count a predetermined number of cycles of the alternating current supply and provide an output signal at a predetermined point during a half cycle of predetermined polarity on the voltage wave of the supply, a second counter having NOR unit components for controlling the sequence of a plurality of operations to be performed by the welder, said second counter having an input responsive to the output signal of the first counter and arranged to provide an output signal at a different predetermined point during a half cycle of opposite polarity on the voltage wave of the supply than the output signal of the first counter, and a means including a NOR memory having inputs responsive to the output signals of both counters for initiating conduction of the ignitrons in response to the output of the second counter and for terminating said conduction in response to the output of the first counter.

3. A control for a resistance welder having a pair of ignitrons each conductible for passing selected portions of alternate half cycles of an alternating current to a load from an alternating current supply, comprising; a first NOR unit counter means arranged to count a predetermined number of cycles of the alternating current supply to time the duration of an operation, said counter means being arranged to initiate each count and provide an output signal when the counter has counted a predetermined number of cycles at a predetermined point during a half cycle of one polarity on the voltage wave of the supply, a second NOR unit counter means for controlling the sequence of operations to be performed by the welder, said second counter having an input responsive to the output signal of the first counter and arranged to provide a reset signal to the first counter means in response to the input, said second counter being arranged to provide an output signal during a half cycle of opposite polarity and at a predetermined point different than the half cycle and point at which the first counter means provides an output signal, means including a pair of NOR units each having outputs and inputs connected as a NOR memory, said NOR memory having an input responsive to the output signal of the first counter and providing an output signal in response to the output signal from the first counter, an additional NOR unit having; an output, an input responsive to the output of the NOR memory, an input responsive to the output signal of the second counter means, and a third input, means connected to the third input of the additional NOR unit providing an alternating signal which changes once during each half cycle of current flow of the supply at an adjustable point during each half cycle, said additional NOR unit providing an output responsive to all of the inputs thereto, and means responsive to the output of the additional NOR unit providing an alternating signal for controlling the conduction of the ignitrons, said inputs to the third NOR and the NOR memory being arranged so the last mentioned means provides a signal which is initiated at the predetermined point during the half cycle wherein the second counter means has an output and terminates during the half cycle wherein the first counter means has an output to assure delayed firing of the ignitrons in a lead-trail sequence.

4. In a control circuit for controlling the passage of an alternating current from an alternating current source to a load, a pair of electronic switches connected to pass alternate half cycles of alternating current, means for selectively rendering said switches conductive, a first and a second switchable NOR unit connected as a NOR memory, each of said NOR units having an input and an output with the output of the first NOR unit providing an output for the NOR memory, a third switchable NOR unit having a pair of inputs and an output arranged to provide a signal for controlling the conductive state of said switches, means connected with the input of the first NOR for switching said NOR memory at a predetermined point on the voltage wave of the alternating current source during one half cycle of said voltage wave, means connected with the input of the second NOR for switching the NOR memory at a predetermined point on the voltage wave of said source during a half cycle succeeding the first half cycle which is of opposite polarity to the first half cycle, and means connected with the other input of the third NOR unit for switching the third NOR during the interval between the first and succeeding half cycles.

5. A circuit for supplying a delayed firing signal in a resistance welder controller, comprising; a transformer having a primary winding arranged to energize a secondary winding having two sections having voltage outputs 180° out of phase with each other, means connected with one of said secondary winding sections to slightly change the 180° relationship between the voltage outputs of said sections, a phase shift means connecting the primary winding to a supply of alternating current arranged so the output voltages of the sections are output of phase by a predetermined phase angle with the voltage wave of the supply, a pair of NOR units each having an output with the inputs thereof connected to the outputs of said sections and an additional NOR unit having inputs connected to the outputs of both pairs of NOR units.

6. A circuit for controlling the delayed firing of a resistance welder comprising; a transformer having a primary winding and a secondary winding having a pair of terminals, said windings being arranged so the logic signals present at the terminals are complementary to each other, means connecting the primary winding to an alternating current supply so the signals present at the terminals are out of phase with the voltage of the supply by a predetermined phase angle, means connected with one of the terminals of the secondary winding for phase shifting the signal at the said one terminal so the signals at both terminals are identical for a momentary time interval succeeding the predetermined phase angle, a NOR unit having an input connected to the said one terminal, a second NOR unit connected to the other terminal, each of said NOR units having an output, and a third NOR unit connected to the outputs of said first and second mentioned NOR units whereby the said third NOR unit provides a momentary output signal change at the predetermined phase angle when the signals at the terminals are identical with each other and with the output signal.

7. A circuit for controlling the delayed firing of a resistance welder so current flow through a primary winding of a welder transformer is initiated at a predetermined point on the voltage wave of an alternating current source which supplies the primary winding, comprising; a first NOR unit having a pair of inputs and an output, a second NOR unit having an output connected to one of said inputs, a third NOR unit having an output connected to the other input, each of said second and third NOR units having an input and arranged to respectively supply an output signal of "0" to said first NOR unit when a "1" signal is supplied to the respective inputs of said second and third NOR units, and a means for supplying simultaneous "1" signals to the inputs of the second and third NOR units for a momentary interval after said predetermined point on the voltage wave of the source whereby said first NOR unit supplies a "1" output signal for said momentary interval.

8. A lead-trail firing control circuit for a resistance welder controller having a pair of ignitrons connected to an alternating current source, comprising; a transformer having a primary winding connected to the alternating current source and a two section secondary winding providing voltage outputs of opposite polarity, a means for phase shifting the output of one of said sections so the polarity output of said sections is identical for a momentary interval at the beginning of one half cycle and the ending of the succeeding half cycle of the voltage wave of the alternating current source, and a NOR unit having a pair of inputs connected to the two voltage outputs for providing an output signal only during the momentary interval.

9. A lead-trail delayed firing circuit for controlling the conduction of a pair of ignitrons in a resistance welder controller, comprising; a pair of NOR units interconnected as a NOR memory, each of said NOR units having a conductive and a non conductive state and at least one input and the NOR memory having at least an output terminal, means connected with the input of one of said NORS for switching the conductive state of the said one NOR at a predetermined point on a voltage wave during a first half cycle of an alternating current supply for the ignitrons for initiating conduction of one of the ignitrons at said point and means connected with the input of the other of said NORS for switching the conductive state of said other NOR at a predetermined point on a succeeding half cycle voltage wave of the alternating current supply for terminating the conduction of the ignitrons.

10. A lead-trail delayed firing circuit for controlling the conductive state of a pair of ignitrons of a resistance welder comprising: a first and second NOR unit interconnected as a NOR memory to a bistable conductive state, each of said NOR units having an input terminal and said NOR memory having an output terminal providing an output signal indicative of the conductive state of the first NOR unit, a first means connected to the input terminal of the second NOR unit for supplying a momentary signal and causing said second NOR to conduct at the end of one half cycle of a voltage wave of an alternating current supply and cause said first NOR to initiate an output signal, a second means connected to the input terminal of the first NOR unit for supplying a momentary signal for causing the first NOR unit to conduct at a predetermined point on said voltage wave during a half cycle succeeding said first mentioned half cycle, and terminate said output signal.

11. The combination as recited in claim 3 wherein an additional means responsive to an external signal is connected to said first and second means causes the memory to have a continuous output signal during intervals of an absence of a signal to said additional means.

12. A heat control circuit for use in a resistance welder controller, comprising; a transformer having a primary winding arranged to energize a secondary winding having two sections each having an output terminal providing output voltage signals 180° out of phase with each other, a phase shift means connecting the primary winding to a supply of alternating current arranged so the output voltages of the sections are adjustably out of phase by a predetermined phase angle with the voltage wave of the supply, a pair of NOR units interconnected with each other to provide a bistable state switchable NOR memory, one of said NOR units having an input connected with an output terminal of one of said sections and providing an output for the memory, and the other NOR unit having an input connected with the output terminal of the other of said sections whereby said NOR memory is switched twice during each full cycle of the voltage wave of the supply at adjustable points on said supply voltage wave.

13. A heat control circuit for use in a resistance welder comprising; a pair of NOR units each having a pair of input terminals and an output terminal with one of the inputs of each of the NOR units interconnected with the output of the other NOR unit to provide a bisable switchable NOR memory, an output terminal for the memory connected to the output terminal of one of the NOR units, a transformer having a primary winding and a secondary winding, with the secondary winding having a pair of output terminals, a phase shift means connecting the primary winding with a source of alternating current supply arranged so the output voltages at the output terminals of the secondary winding are opposed to each other and adjustably out of phase with the voltage wave of the source by an adjustable phase angle, means connecting the other inputs of the NOR units to the terminals of the secondary winding so the inputs to said NOR units are of opposite polarity and thereby switch the NOR memory twice during each full cycle of the voltage wave of the supply.

14. A static time delay circuit for use in logic systems having an input terminal and an output terminal connectible in circuit with other logic units in the logic system comprising; a pair of NOR circuits connected as a NOR memory and arranged to provide an output signal to the output terminal, a capacitor and a resistor connected in series at a junction and in parallel circuit with one of the NOR circuits across a D.C. source, a third NOR circuit connected in a discharge circuit for the capacitor having an input connected to the input terminal and an output connected in the discharge circuit, a blocking diode connected in the discharge circuit between the output of the third NOR circuit and the junction and arranged to prevent current flow from the junction to the output of the third NOR circuit, a zener diode connected between the junction and one of the inputs of the said one NOR of the NOR memory and arranged to block current flow to said junction from the said one NOR until the potential across the capacitor exceeds the breakdown potential of the zener diode.

References Cited by the Examiner

UNITED STATES PATENTS

| | | | |
|---|---|---|---|
| 2,862,114 | 11/1958 | Solomon | 315—84.6 X |
| 2,883,583 | 4/1959 | Large et al. | 315—252 |
| 2,975,338 | 3/1961 | Bivens et al. | 315—84.6 X |
| 2,977,486 | 3/1961 | Dobbie | 307—88.5 |
| 3,010,049 | 11/1961 | Riley et al. | 315—252 X |
| 3,049,628 | 8/1962 | Kaufman | 307—88.5 |
| 3,052,801 | 9/1962 | Kaufman et al. | 328—48 X |

OTHER REFERENCES

Dahlin: "Transistor NOR Elements Program Welder," Control Engineering, vol. 7, February 1960, pages 111 and 113.

JOHN W. HUCKERT, *Primary Examiner.*

JAMES D. KALLAM, *Examiner.*

A. S. KATZ, D. O. KRAFT, *Assistant Examiners.*